United States Patent
Hattori

(10) Patent No.: US 9,898,632 B2
(45) Date of Patent: *Feb. 20, 2018

(54) ARTICLE MANAGEMENT SYSTEM, ARTICLE MANAGEMENT METHOD, AND NON-TRANSITORY COMPUTER READABLE MEDIUM STORING ARTICLE MANAGEMENT PROGRAM

(71) Applicant: NEC Corporation, Tokyo (JP)

(72) Inventor: Wataru Hattori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 63 days.

This patent is subject to a terminal disclaimer.

(21) Appl. No.: 14/892,431

(22) PCT Filed: Apr. 15, 2014

(86) PCT No.: PCT/JP2014/002121
§ 371 (c)(1),
(2) Date: Nov. 19, 2015

(87) PCT Pub. No.: WO2014/188653
PCT Pub. Date: Nov. 27, 2014

(65) Prior Publication Data
US 2016/0125211 A1    May 5, 2016

(30) Foreign Application Priority Data
May 20, 2013 (JP) ................. 2013-105982

(51) Int. Cl.
*H04Q 5/22* (2006.01)
*G06K 7/10* (2006.01)
*G06Q 10/06* (2012.01)

(52) U.S. Cl.
CPC ......... *G06K 7/10366* (2013.01); *G06Q 10/06* (2013.01)

(58) Field of Classification Search
CPC ............................ G06K 7/10366; G06Q 10/06
(Continued)

(56) References Cited

U.S. PATENT DOCUMENTS

| | | | | |
|---|---|---|---|---|
| 6,388,630 B1 * | 5/2002 | Kruger | ............... | G06K 7/0008 340/572.1 |
| 6,750,769 B1 * | 6/2004 | Smith | ............... | G01S 13/751 340/572.1 |

(Continued)

FOREIGN PATENT DOCUMENTS

| | | |
|---|---|---|
| JP | 2004-220141 A | 8/2004 |
| JP | 2005-228292 A | 8/2005 |

(Continued)

OTHER PUBLICATIONS

International Search Report for PCT/JP2014/002121 dated Jun. 3, 2014 [PCT/ISA/210].

(Continued)

*Primary Examiner* — Naomi Small
(74) *Attorney, Agent, or Firm* — Sughrue Mion, PLLC

(57) ABSTRACT

An article management system includes RFID tags (102) fixed above a reader waveguide (101), a tag position table storage unit (106) that stores tag information and fixed positions of the RFID tags (102) in association with each other, an article position table storage unit (105) that stores identification information and an assigned position of an article (108) in association with each other, an article management table storage unit (107) that stores the identification information of the article (108) and the tag information of the RFID tags (102) in association with each other, a tag reading unit (103) that reads the RFID tags (102) by electromagnetic coupling through the reader waveguide (101), and an article presence/absence determination unit that determines presence or absence of placement of the article (Continued)

(108) corresponding to the RFID tags (102) based on results of reading the RFID tags (102).

15 Claims, 26 Drawing Sheets

(58) Field of Classification Search
USPC .......................................................... 340/10.1
See application file for complete search history.

(56) References Cited

U.S. PATENT DOCUMENTS

| | | | |
|---|---|---|---|
| 7,271,724 B2 | 9/2007 | Goyal et al. | |
| 8,695,878 B2* | 4/2014 | Burnside | G06Q 10/087 235/385 |
| 8,847,764 B2* | 9/2014 | Forster | G06K 7/10178 340/539.21 |
| 2004/0253818 A1 | 12/2004 | Okamoto et al. | |
| 2006/0027658 A1* | 2/2006 | Genc | G01S 13/825 235/454 |
| 2006/0086809 A1 | 4/2006 | Shanks et al. | |
| 2008/0055088 A1 | 3/2008 | Fabre et al. | |
| 2009/0121828 A1* | 5/2009 | Suzuki | G06Q 10/00 340/5.1 |
| 2009/0167502 A1* | 7/2009 | Erickson | G06K 7/0008 340/10.3 |
| 2010/0019906 A1* | 1/2010 | Kushida | B65G 1/137 340/572.1 |
| 2010/0060453 A1* | 3/2010 | Kushida | G06Q 10/087 340/572.1 |
| 2010/0194538 A1* | 8/2010 | dos Reis Medeiros | G06K 7/0008 340/10.1 |
| 2011/0128125 A1 | 6/2011 | Kai et al. | |
| 2012/0194300 A1* | 8/2012 | Oouchida | H04B 13/00 333/238 |
| 2013/0021140 A1* | 1/2013 | Forster | G06K 7/10178 340/10.1 |
| 2013/0048724 A1 | 2/2013 | Burnside et al. | |

FOREIGN PATENT DOCUMENTS

| | | |
|---|---|---|
| JP | 2008-280140 A | 11/2008 |
| JP | 2009-100951 A | 5/2009 |
| JP | 5128898 B2 | 5/2009 |
| JP | 2010-089870 A | 4/2010 |
| JP | 2010-211451 A | 9/2010 |
| JP | 2012-235204 A | 11/2012 |
| JP | 2014-527239 A | 10/2014 |
| WO | 2006/104587 A2 | 10/2006 |

OTHER PUBLICATIONS

Communication dated Nov. 16, 2016, issued by the European Patent Office in corresponding European Application No. 14801750.2.
Communication dated Nov. 7, 2017 from the Japanese Patent Office in counterpart application No. 2015-518057..

* cited by examiner

| DISTANCE Y | $1/4 \cdot (\lambda/2\pi)$ $\fallingdotseq 0.04\lambda$ | $1/2 \cdot (\lambda/2\pi)$ $\fallingdotseq 0.08\lambda$ | $\lambda/2\pi$ $\fallingdotseq 0.16\lambda$ | $2 \cdot (\lambda/2\pi)$ $\fallingdotseq 0.32\lambda$ | $\lambda$ | $2\lambda$ |
|---|---|---|---|---|---|---|
| AT 950MHz | 1.3cm | 2.5cm | 5.0cm | 10.1cm | 31.6cm | 63.2cm |
| QUASI-STATIC ELECTRIC FIELD ($1/Y^3$) | 64 | 8 | 1 | $1/8 \fallingdotseq 0.13$ | $\fallingdotseq 0.004$ | $\fallingdotseq 5 \times 10^{-4}$ |
| INDUCED ELECTRIC FIELD ($1/Y^2$) | 16 | 4 | 1 | $1/4 \fallingdotseq 0.13$ | $\fallingdotseq 0.025$ | $\fallingdotseq 6 \times 10^{-3}$ |
| RADIATED ELECTRIC FIELD ($1/Y$) | 4 | 2 | 1 | $1/2 \fallingdotseq 0.5$ | $\fallingdotseq 0.16$ | $\fallingdotseq 0.08$ |

Fig. 9

| COMMODITY NAME | MANUFACTURER | COMMODITY SIZE | | | SPACE PLANNING INFORMATION | | | |
|---|---|---|---|---|---|---|---|---|
| | | WIDTH | HEIGHT | DEPTH | SHELF NUMBER | ROW NUMBER | FACE | QUANTITY IN DEPTH |
| CANNED TUNA | AAA | 70 | 30 | 70 | 03 | 2 | 340 | 6 |
| CANNED SALMON | BBB | 50 | 50 | 50 | 03 | 2 | 342 | 5 |
| CANNED CRAB | CCC | 60 | 30 | 60 | 03 | 2 | 346 | 10 |
| | | | | | | | | |
| | | | | | | | | |
| | | | | | | | | |
| | | | | | | | | |
| | | | | | | | | |

| COMMODITY NAME | MANUFACTURER | SPACE PLANNING INFORMATION ||||  TAG ID | PRESENCE OF COMMODITY |
| --- | --- | --- | --- | --- | --- | --- | --- |
| | | SHELF NUMBER | ROW NUMBER | FACE | ORDER IN DEPTH | | |
| CANNED TUNA | AAA | 03 | 2 | 340 | 1 | 12340001 | NO |
| CANNED TUNA | AAA | 03 | 2 | 340 | 2 | 12340002<br>12340003 | YES |
| CANNED TUNA | AAA | 03 | 2 | 340 | 3 | 12340004 | YES |
| CANNED TUNA | AAA | 03 | 2 | 340 | 4 | 12340005<br>12340006 | YES |
| CANNED TUNA | AAA | | | | | | |
| CANNED TUNA | AAA | | | | | | |
| CANNED SALMON | BBB | | | | | | |
| CANNED CRAB | CCC | | | | | | |

11c

ARTICLE MANAGEMENT SYSTEM, ARTICLE MANAGEMENT METHOD, AND NON-TRANSITORY COMPUTER READABLE MEDIUM STORING ARTICLE MANAGEMENT PROGRAM

CROSS REFERENCE TO RELATED APPLICATIONS

This application is a National Stage of International Application No. PCT/JP2014/002121 filed Apr. 15, 2014, claiming priority based on Japanese Patent Application No. 2013-105982 filed May 20, 2013, the contents of all of which are incorporated herein by reference in their entirety.

TECHNICAL FIELD

The present invention relates to an article management system, an article management method, and a non-transitory computer readable medium storing an article management program, and more particularly, to an article management system, an article management method, and a non-transitory computer readable medium storing an article management program that manage articles using RFID tags.

BACKGROUND ART

In general, it is possible to grasp the stock status in a store by cooperation with a Point of Sales (POS) system. However, it is difficult to grasp the presence or absence of commodities on commodity display shelf, and even hot-selling commodities are sometimes out of stock on the commodity display shelf, which causes sales opportunity losses. Further, although it is known that the sales clearly vary depending on the way commodities are arranged in the commodity display shelf, it takes time for a store clerk to check the arrangement of commodities on the commodity display shelf one by one, and thus the commodities are sometimes left uncontrolled without being appropriately arranged for enhancing the sales of the commodities.

Space planning for determining the placement of commodities on a commodity display shelf is carried out in stores. The space planning is done at regular intervals such as every season or each time new items come out in order to stimulate buying motivation of consumers.

Thus, there is a need for a technique that effectively manages the display of commodities and that is adaptable to a change in display of commodities by space planning or the like.

Patent Literatures 1 and 2 below are known as techniques related to the management of articles such as commodities. Patent Literatures 1 and 2 disclose an article management method that places an RFID tag at a commodity display position on a shelf, and determines that there is a commodity when the RFID tag cannot be read by an RFID reader.

CITATION LIST

Patent Literature

PTL1: U.S. Pat. No. 7,271,724
PTL2: Japanese Patent No. 5128898

SUMMARY OF INVENTION

Technical Problem

However, in the article management method according to related art such as Patent Literatures 1 and 2, one RFID tag to be placed is fixedly assigned in advance to one article to be managed in principle. In this case, when the position to place an article changes by space planning or the like, the position to place the RFID tag needs to be changed accordingly. Further, when the size or interval of an article to be managed changes, the position to place the RFID tag needs to be changed accordingly. Particularly, when the number of articles to be managed increases, work that changes the tag placement position becomes complicated.

In view of the aforementioned problems, the present invention mainly aims to provide an article management system, an article management method, and a non-transitory computer readable medium storing an article management program capable of managing articles in a simplified way even when the placement of articles is changed.

Solution to Problem

An article management system according to an exemplary aspect of the present invention includes a reader waveguide formed as an open transmission line terminated with matching impedance; a plurality of RFID tags fixed in an article allocable area above the reader waveguide and electromagnetically coupled to the reader waveguide; a tag position table storage means for storing a tag position table associating tag information of the plurality of RFID tags and fixed positions of the plurality of RFID tags; an article position table storage means for storing an article position table associating identification information of articles and assigned positions of the articles assigned to place the articles in the allocable area; an article management table storage means for storing an article management table associating the identification information of the articles and the tag information of the plurality of RFID tags based on the tag position table and the article position table; a tag reading means for reading the plurality of RFID tags by electromagnetic coupling through the reader waveguide; and an article presence/absence determination means for determining presence or absence of an article corresponding to the plurality of RFID tags based on results of reading the plurality of RFID tags by referring to the article management table.

An article management method according to an exemplary aspect of the present invention includes fixing a plurality of RFID tags in an article allocable area above a reader waveguide formed as an open transmission line terminated with matching impedance, the plurality of RFID tags to be electromagnetically coupled to the reader waveguide; storing a tag position table associating tag information of the plurality of RFID tags and fixed positions of the plurality of RFID tags; storing an article position table associating identification information of articles and assigned positions of the articles assigned to place the articles in the allocable area; storing an article management table associating the identification information of the articles and the tag information of the plurality of RFID tags based on the tag position table and the article position table; reading the plurality of RFID tags by electromagnetic coupling through the reader waveguide; and determining presence or absence of an article corresponding to the plurality of RFID tags based on results of reading the plurality of RFID tags by referring to the article management table.

A non-transitory computer readable medium storing an article management program according to an exemplary aspect of the present invention is a non-transitory computer readable medium storing an article management program causing a computer to execute an article management process, the article management process including storing a tag position table associating tag information of a plurality of RFID tags and fixed positions of the plurality of RFID tags, the plurality of RFID tags being fixed in an article allocable area above a reader waveguide formed as an open transmission line terminated with matching impedance and being electromagnetically coupled to the reader waveguide; storing an article position table associating identification information of articles and assigned positions of the articles assigned to place the articles in the allocable area; storing an article management table associating the identification information of the articles and the tag information of the plurality of RFID tags based on the tag position table and the article position table; reading the plurality of RFID tags by electromagnetic coupling through the reader waveguide; and determining presence or absence of an article corresponding to the plurality of RFID tags based on results of reading the plurality of RFID tags by referring to the article management table.

Advantageous Effects of Invention

According to the present invention, it is possible to provide an article management system, an article management method, and a non-transitory computer readable medium storing an article management program capable of managing articles in a simplified way even when the placement of articles is changed.

BRIEF DESCRIPTION OF DRAWINGS

FIG. 9 is a table showing a relationship of a distance and an electric field of an RFID tag according to the first exemplary embodiment;

FIG. 11 is a view showing an example of data stored in the store management device according to the first exemplary embodiment;

FIG. 13 is a view showing an example of data stored in the store management device according to the first exemplary embodiment;

DESCRIPTION OF EMBODIMENTS

Overview of Exemplary Embodiment

Figure 1:
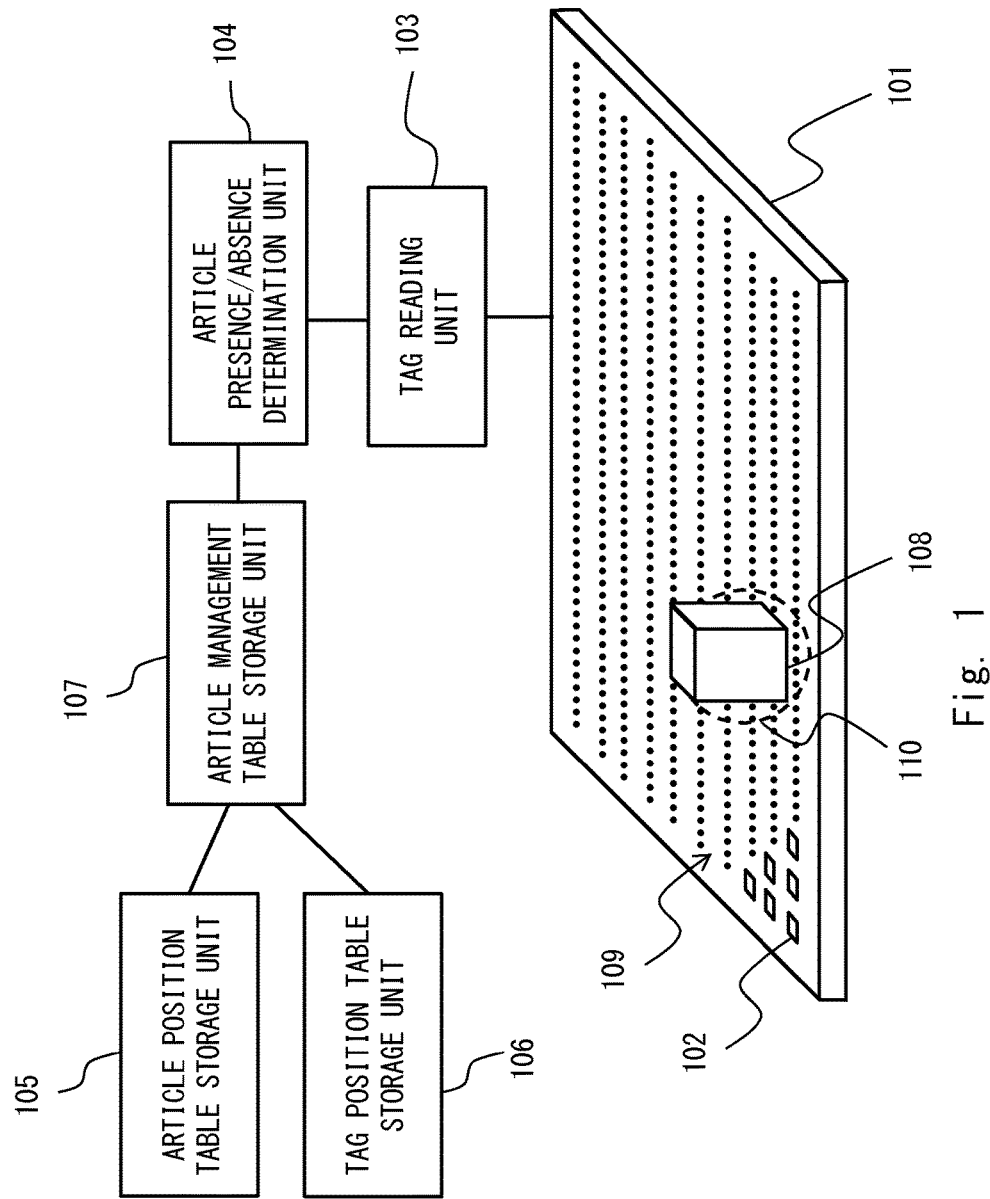
FIG. 1 is a block diagram illustrating the main characteristics of an article management system according to an exemplary embodiment.

Prior to describing exemplary embodiments, the overview of the characteristics of exemplary embodiments is described hereinbelow. FIG. 1 shows main elements of an article management system according to an exemplary embodiment.

As shown in FIG. 1, the article management system according to this exemplary embodiment includes a reader waveguide 101, a plurality of RFID tags 102, a tag reading unit 103, an article presence/absence determination unit 104, an article position table storage unit 105, tag position table storage unit 106, and an article management table storage unit 107.

The reader waveguide 101 is formed as an open transmission line terminated with matching impedance. The plurality of RFID tags 102 are fixed in an allocable area 109 of an article 108 located above the reader waveguide 101 and electromagnetically coupled to the reader waveguide 101.

The article position table storage unit 105 stores an article position table where identification information of the article 108 and an assigned position 110 of the article that is assigned to place the article 108 in the allocable area 109 are associated with each other. The tag position table storage unit 106 stores a tag position table where tag information of the plurality of RFID tags 102 and fixed positions of the plurality of RFID tags 102 are associated with each other. The article management table storage unit 107 stores an article management table where the identification information of the article 108 and the tag information of the plurality of RFID tags 102 are associated with each other based on the article position table and the tag position table.

The tag reading unit 103 performs reading from the plurality of RFID tags 102 by electromagnetic coupling through the reader waveguide 101. The article presence/absence determination unit 104 refers to the article management table and determines the presence or absence of the placement of the article 108 corresponding to the plurality of RFID tags 102 based on results of reading the plurality of RFID tags 102.

As described above, in this exemplary embodiment, the article position table associating the identification information of articles and the assigned positions of the articles and the tag position table associating the tag information of the plurality of RFID tags and the fixed positions of the plurality of RFID tags are stored, and further the article management table associating the identification information of articles and the tag information of the plurality of RFID tags based on the article position table and the tag position table is stored. Then, by referring to the article management table, the presence or absence of an article corresponding to the plurality of RFID tags is determined based on results of reading the plurality of RFID tags.

Thus, in the case where the placement of articles is changed, the presence or absence of the articles corresponding to the read RFID tags can be determined by changing the article management table according to the assigned positions of the articles. It is thereby possible to easily manage the articles without need to change the positions or structures of RFID tags according to a change in the placement of the articles.

First Exemplary Embodiment

Figure 2:
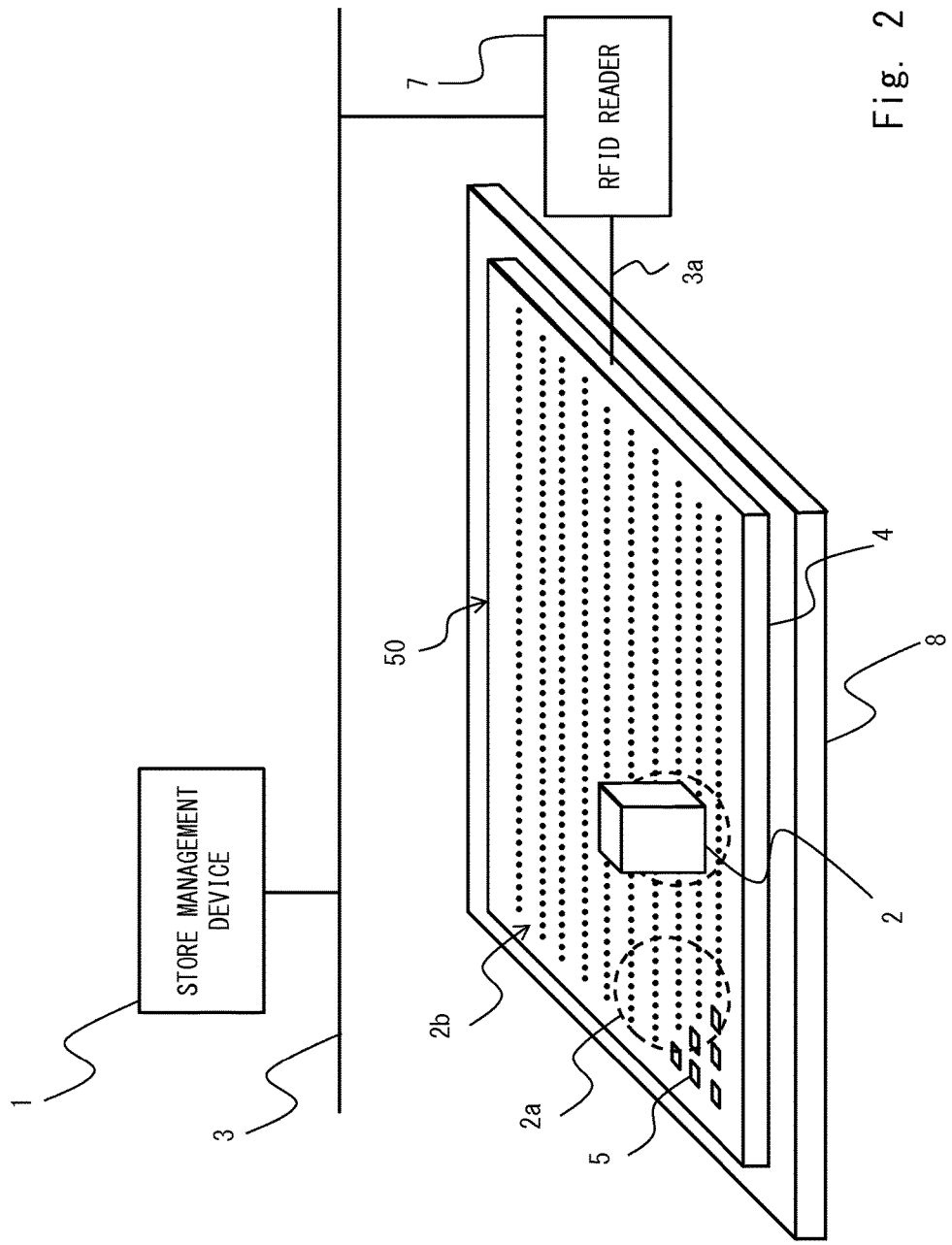
FIG. 2 is a block diagram showing the configuration of a commodity management system according to a first exemplary embodiment.

A first exemplary embodiment is described hereinafter with reference to the drawings. FIG. 2 shows an example of the configuration of a commodity management system according to this exemplary embodiment. The commodity management system constantly monitors the commodities displayed on a commodity display shelf in a store or the like to determine the presence or absence of the commodities on the commodity display shelf, and further performs processing such as display related to the display status. Although an example of the commodity management system that manages commodities is described in this example, it may be an article management system that manages other articles, not limited to commodities, which are detectable in this exemplary embodiment.

As shown in FIG. 2, the commodity management system according to this exemplary embodiment includes a store management device 1, an RFID reader 7, a commodity display shelf 8, and a tag antenna unit 50 including a reader waveguide 4 and RFID tags 5. Note that the system may include a plurality of commodity display shelves 8, or the commodity display shelf 8 may be provided with a plurality of reader waveguides 4 (tag antenna units 50).

The RFID reader 7 and the store management device 1 are connected to be able to transmit and receive data through a communication network 3 such as LAN. The RFID reader 7 and the reader waveguide 4 are connected through a high-frequency cable 3a.

The tag antenna unit 50 is placed all over the area where commodities can be displayed on the commodity display shelf 8. The tag antenna unit 50 is composed of the reader waveguide 4 and the RFID tags 5, and a plurality of RFID tags 5 are fixedly placed in advance on the reader waveguide 4 that at least includes the area where commodities can be displayed. In this example, the whole top surface of the reader waveguide 4 (tag antenna unit 50) is a commodity displayable area 2b. The commodity displayable area 2b is an allocable area in which a commodity 2 can be placed, and it includes a display position (placement area) 2a that is assigned to display (place) the commodity 2 by space planning. The display position 2a includes at least one RFID tag 5 that is fixedly placed in advance. Note that the display position 2a includes a place (coordinates) where a commodity is to be placed and may further include an area required to place a commodity in some cases.

For example, the commodity display shelf 8 may be provided with a positioning mechanism, and positioning may be done when mounting the tag antenna unit 50 (reader waveguide 4). As the positioning mechanism, a mark or the like indicating the placement position of the tag antenna unit 50 may be displayed on the commodity display shelf 8. Alternatively, instead of the commodity display shelf 8, the tag antenna unit 50 may be used as a substitute for the shelf board.

Figure 3A:
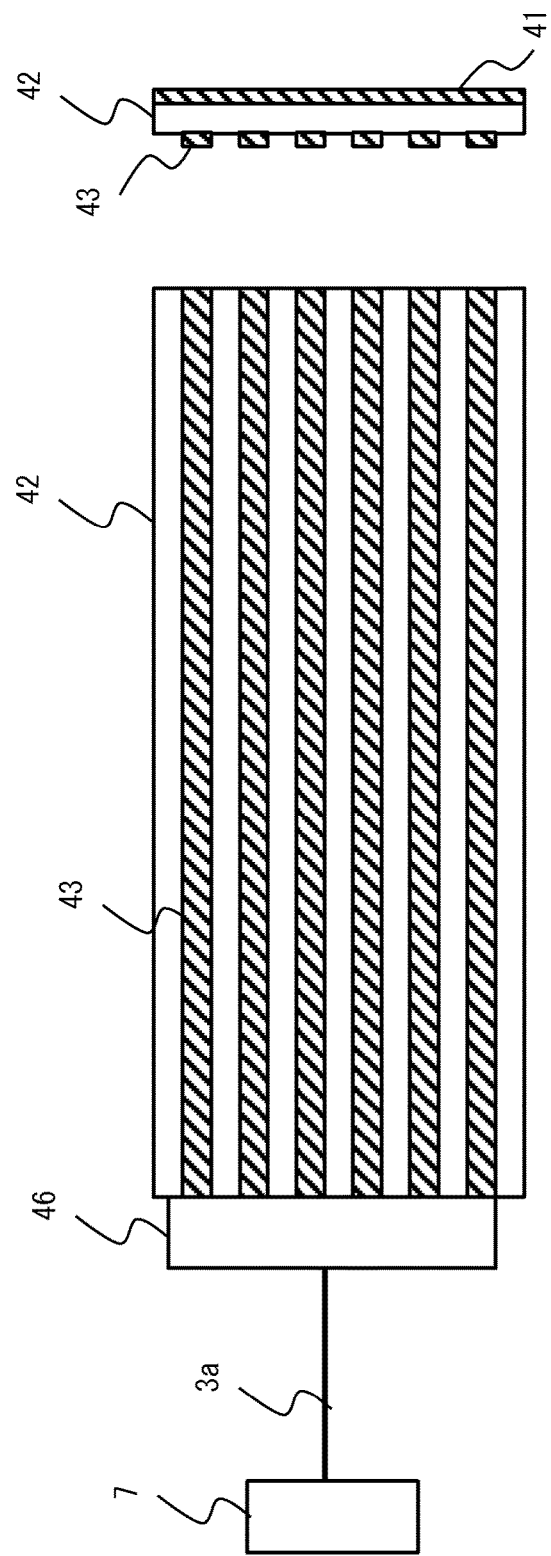
FIG. 3A is a diagram showing an exemplary structure of a reader waveguide according to the first exemplary embodiment.

The reader waveguide 4 is formed as an open transmission line terminated with matching impedance, and it is an open waveguide having a structure in which electromagnetic waves come out to the area surrounding the waveguide as a near-field, such as a microstrip structure, a coplanar line, or a slot line. FIG. 3A shows an example where the reader waveguide 4 is formed as microstrip lines, and FIG. 3B shows an example where the reader waveguide 4 is formed as parallel lines.

In the example of FIG. 3A, the RFID reader 7 and a distributor 46 are connected through a high-frequency cable 3a, and the distributor 46 distributes signals of the high-frequency cable 3a to a plurality of strip conductors (micro strip lines) 43. A plurality of strip conductors 43 lie in parallel on a spacer 42, which is a dielectric layer, and a ground plane 41 is formed over the whole area below the spacer 42.

Figure 3B:
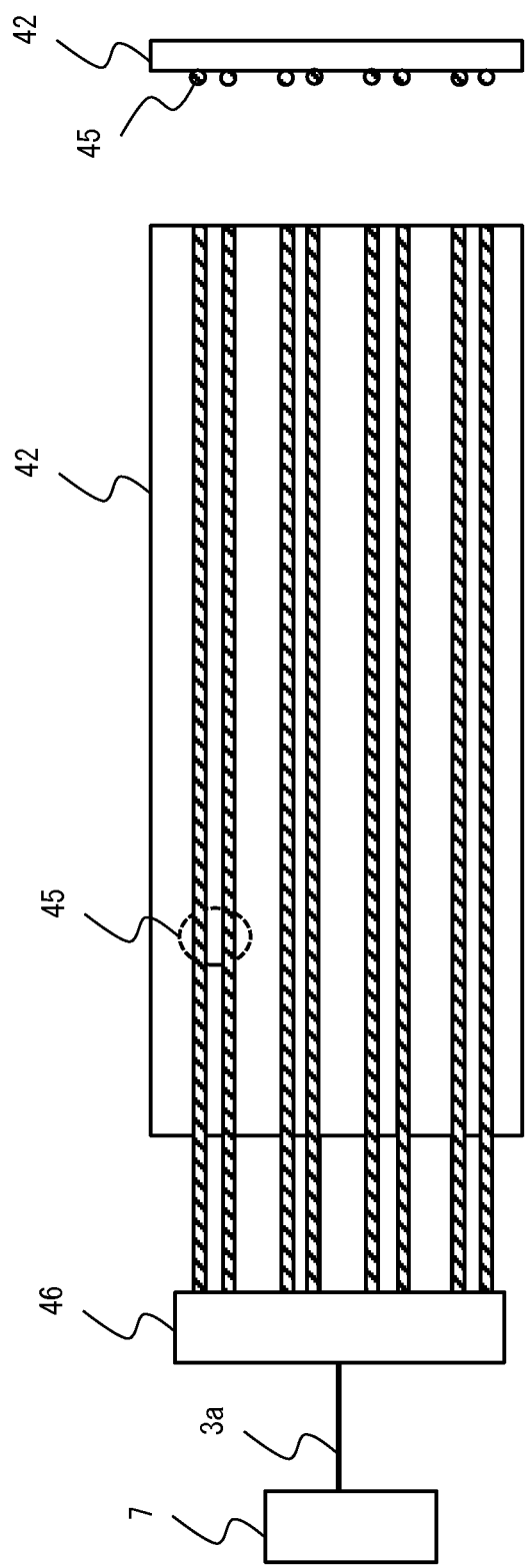
FIG. 3B is a diagram showing an exemplary structure of the reader waveguide according to the first exemplary embodiment.

In the example of FIG. 3B, the RFID reader 7 and a distributor 46 are connected through a high-frequency cable 3a, and the distributor 46 distributes signals of the high-frequency cable 3a to a plurality of parallel lines 45. A plurality of parallel lines 45 lie in parallel on a spacer 42, which is a dielectric layer. Note that, the distributor 46 may have a function such as impedance conversion or balance-unbalance conversion.

Figure 4:
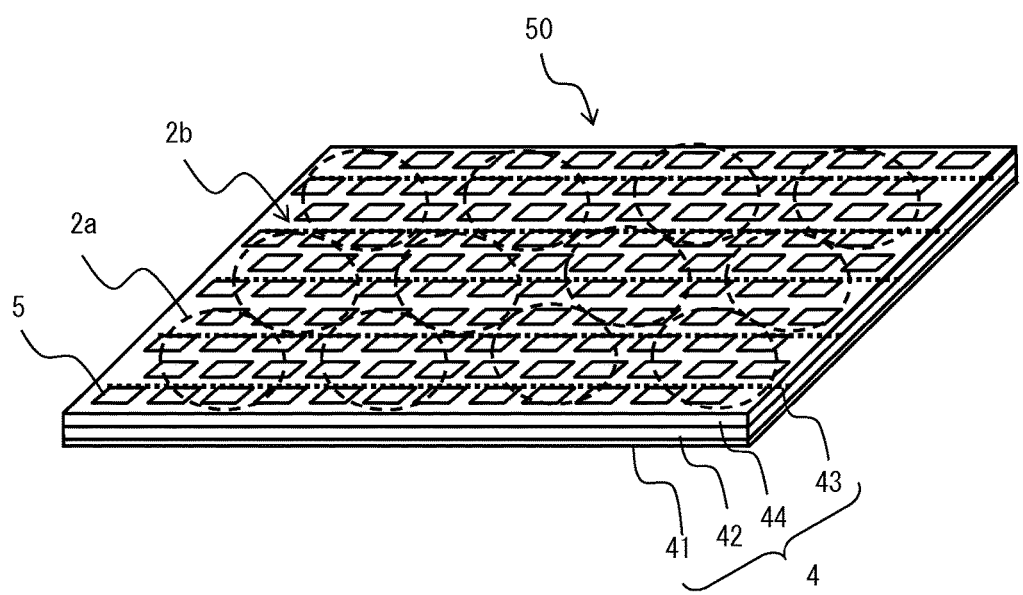
FIG. 4 is a perspective view showing the structure of a tag antenna unit according to the first exemplary embodiment.
Figure 5:
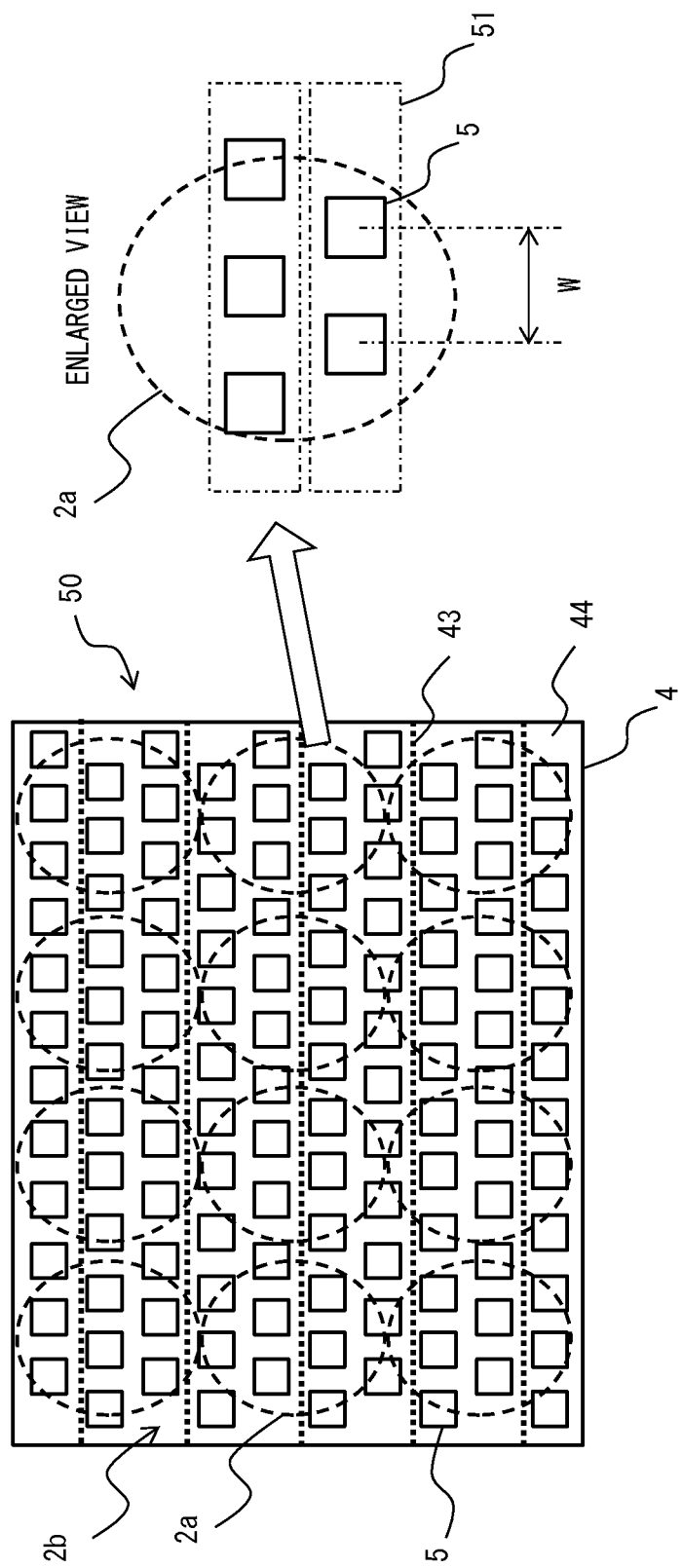
FIG. 5 is a top view showing the structure of the tag antenna unit according to the first exemplary embodiment.
Figure 6:
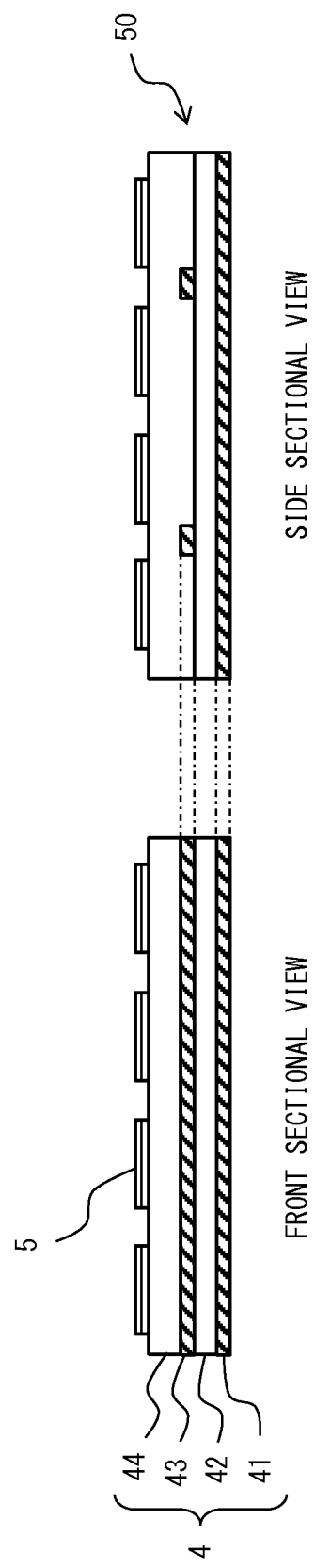
FIG. 6 is a sectional view showing the structure of the tag antenna unit according to the first exemplary embodiment.

A specific exemplary structure of the tag antenna unit 50 according to this exemplary embodiment is described hereinafter with reference to FIGS. 4 to 6. FIG. 4 is a perspective view of the tag antenna unit 50, FIG. 5 is a top view thereof, and FIG. 6 is a front sectional view and a side sectional view thereof. In this example, the reader waveguide 4 of the tag antenna unit 50 is formed as microstrip lines.

As shown in FIGS. 4 to 6, the spacer 42 is formed over the whole area above the ground plane 41, which has the same size as the tag antenna unit 50. A plurality of strip conductors 43 are formed to lie in parallel at specified intervals from one end to the other end on the spacer 42. A spacer 44 is formed over the whole area above the spacer 42 and the strip conductors 43. For example, the spacers 42 and 44 are made of dielectric materials. A plurality of RFID tags 5 are placed in a certain pattern to fill the area above the spacer 44. By placing the plurality of RFID tags 5 in a uniform pattern, it is possible to deal with various commodity placement patterns by space planning.

In order to detect the commodity 2 that is displayed at the display position 2a by the RFID tags 5, the size of the RFID tag 5 is preferably smaller than the size of the display position 2a, which is the size of the commodity (bottom surface) that comes into contact with the placement plane when the commodity 2 is placed. Further, the interval W of the RFID tags 5 shown in the enlarged view of FIG. 5 is preferably narrower than the size of the display position 2a, which is the size of the commodity that comes into contact with the placement plane when the commodity 2 is placed, and it is more preferably less than half the size of the display position 2a. In this case, two or more RFID tags 5 can be included in the display position 2a. Alternatively, the RFID tag that is entirely enclosed in the display position 2a exists by necessity. By detecting one commodity 2 by a plurality of RFID tags 5, it is possible to enhance the detection sensitivity. The interval W is a distance between two adjacent RFID tags 5, and it is a distance from the center of the RFID tag 5 to the center of the adjacent RFID tag 5 as shown in the enlarged view of FIG. 5, for example.

If the RFID tags 5 are placed at small intervals, electromagnetic coupling occurs between the adjacent RFID tags 5 (tag antennas), which can degrade the detection sensitivity. It is thus preferred to place lines of RFID tags 5 that are placed at specified intervals along a specified direction in a staggered fashion. Specifically, as shown in the enlarged view of FIG. 5, a plurality of lines 51 of RFID tags 5 placed at specified intervals W in a direction along which the strip conductors 43 lie (which is the column direction, or the shelf width direction, for example) are arranged. Then, the RFID tags are placed in a staggered fashion so that the RFID tags in the next line (the shelf depth direction) come at the positions between the RFID tags that are adjacent in the column direction (the shelf width direction). By placing the tags in a staggered fashion, the interval (distance) between the RFID tags that are adjacent in each column (the shelf depth direction) increases, thereby suppressing the electromagnetic coupling.

Further, by forming the ground plane 41, capacitance properties can be given to the RFID tags 5, and the RFID tags 5 can be reduced in size. It is thereby possible to read more RFID tags 5 in one strip conductor 43. Note that a protective layer that protects the ground plane 41 may be formed below the ground plane 41.

Further, the two adjacent strip conductors 43 are preferably differential transmission lines that transmit differential signals. If in-phase signals are transmitted through the two strip conductors 43, a region where the electric field is 0 or too weak to read a tag appears between the strip conductors 43, and there is a possibility that the RFID tags 5 cannot be read. To avoid this, by using differential strip conductors that transmit differential signals, such a region does not appear, and it is thus possible to reliably read the RFID tags 5.

In the structures of FIGS. 4 to 6, the RFID tags 5 transmit and receive data to and from the reader waveguide 4 by using UHF band signals. Then, the RFID reader 7 in FIG. 2 reads management information that contains signal intensity information of a response signal output from the RFID tag 5 and the tag information of the RFID tag 5 through the reader waveguide 4. Further, as described in detail later, a distance $L_1$ between the RFID tag 5 and the commodity 2 and a distance $L_2$ between the RFID tag 5 and the reader waveguide 4 are set by the spacer 44. For example, the distances are set to satisfy distance $L_1$<distance $L_2$. Note that it is not necessary to place the spacer 44 if the relationship of the distance $L_1$ and the distance $L_2$ can be set.

Further, the RFID tag 5 has a tag antenna. Since the RFID tag 5 is placed in the above-described position, the tag antenna and the commodity 2 are electromagnetically coupled in the state where the commodity 2 is placed at the display position 2a. The reader waveguide 4 is a transmission line terminated with matching impedance, and it is placed at the above-described position to be electromagnetically coupled to the tag antenna, and when the commodity 2 is not placed thereon, the reader waveguide 4 can transmit and receive radio signals to and from the RFID tag 5.

The RFID reader 7 includes a receiving unit that supplies power to the RFID tags 5 through the reader waveguide 4 by radio waves, and receives radio signals transmitted from the RFID tags 5 through the reader waveguide 4 and acquires information from the received radio signals, and a transmitting and receiving unit that transmits the information transmitted from the RFID tags 5 to the store management device 1. The RFID reader 7 may read the RFID tags 5 at the timing indicated by the store management device 1 or may read the RFID tags 5 at the timing determined by itself. For example, the RFID reader 7 reads the RFID tags 5 at specified time intervals such as one second.

When the commodity 2 is not placed at the position where the RFID tag 5 exists, the RFID reader 7 and each of the RFID tags 5 are able to communicate with each other by electromagnetic coupling with the reader waveguide 4 in a near-field. On the other hand, when the commodity 2 is placed at the position where the RFID tag 5 exists, the communication between the corresponding RFID tag 5 and the RFID reader 7 causes a change in the state of electromagnetic coupling by dielectric or metal of the commodity 2 itself, which results in interruption of information transmitted from the RFID tag 5 to the RFID reader 7 or reduction of signal intensity. Based on the interruption of information or the reduction of signal intensity, the RFID reader 7 (reader waveguide 4) sends a notification that the commodity 2 exists at the corresponding position to the store management device 1, and it is thereby possible to know the status of the commodities on the commodity display shelf 8.

Next, an element for implementing a commodity presence/absence detection method according to this exemplary embodiment using the RFID reader 7, the reader waveguide 4 and the RFID tags 5 (commodity presence/absence detection unit) and the principle of detection are described hereinafter in detail. For example, the RFID reader 7, the reader waveguide 4 and the RFID tags 5 constitute the commodity presence/absence detection unit, and the store management device 1 (commodity presence/absence determination unit) determines the presence or absence of a commodity based on an output from the commodity presence/absence detection unit, thereby implementing the commodity presence/absence detection method according to this exemplary embodiment.

Figure 7:
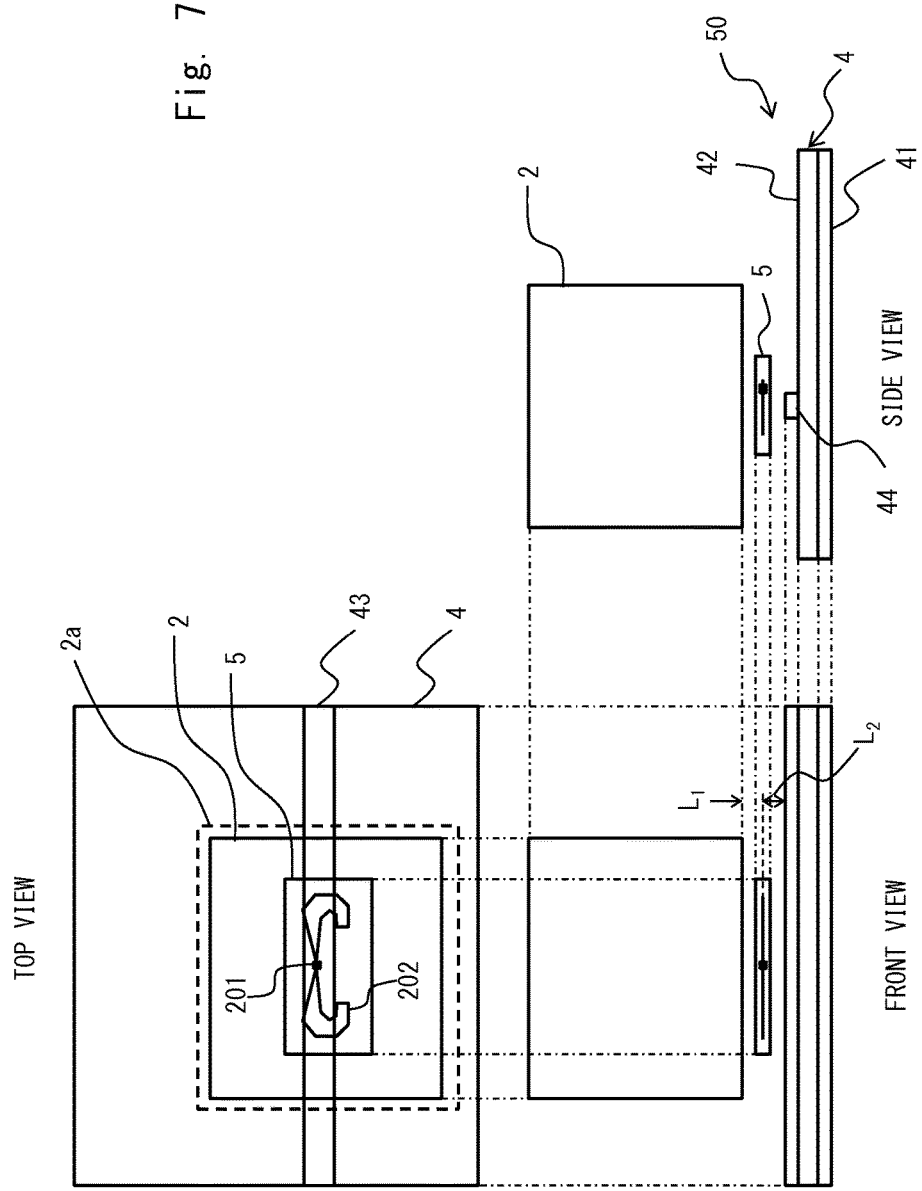
FIG. 7 is a three-view drawing showing an enlarged view of a commodity display place on a commodity display shelf according to the first exemplary embodiment.

FIG. 7 is a three-view drawing of the tag antenna unit 50 which includes the reader waveguide 4 with a microstrip line structure and the RFID tags 5 according to this exemplary embodiment. FIG. 7 shows an enlarged view of a part of the tag antenna unit 50 in which one commodity 2 is placed. For easier understanding of the detection principle, the case where an RFID tag is placed above the strip line and one commodity is placed on one RFID tag is described in this example.

The reader waveguide 4 shown in FIG. 7, just like in FIGS. 4 to 6, is a traveling-wave waveguide for a reader using microstrip lines, which are one type of open transmission lines. The reader waveguide 4 includes a spacer 42, which is a dielectric layer, and a strip conductor 43 is formed on the upper surface of the spacer 42, and a ground plane 41 is formed on the lower surface of the spacer 42. The RFID tag 5 is placed above the strip conductor 43. Further, the commodity 2 is placed in the display position 2a above the RFID tag 5, where the RFID tag 5 is covered. The RFID tag 5 includes an RFID chip 201 and a tag antenna 202.

Figure 8:
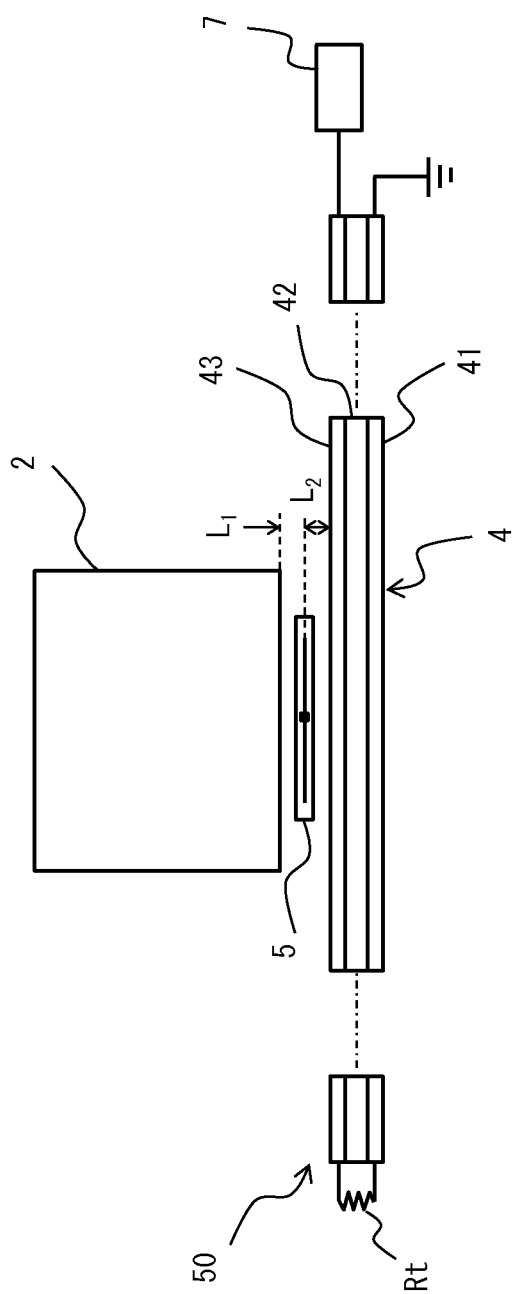
FIG. 8 is a side view showing an enlarged view of a commodity display place on a commodity display shelf according to the first exemplary embodiment.

FIG. 8 is a front view illustrating the commodity presence/absence detection unit that includes the reader waveguide 4, the RFID tag 5 and the RFID reader 7 according to this exemplary embodiment. Like FIG. 7, FIG. 8 shows an enlarged view of a part of the tag antenna unit 50 in which one commodity 2 is placed.

In the reader waveguide 4 in FIG. 8, just like that in FIG. 7, the strip conductor 43 is formed on the upper surface of the spacer 42, and the ground plane 41 is formed on the lower surface of the spacer 42. One end of the strip conductor 43 and the ground plane 41 are connected to each other via a matching termination resistor Rt. With such a connection, the reader waveguide 4 is terminated with matching impedance. Further, the RFID reader 7 is connected at the other end of the strip conductor 43.

As shown in FIG. 8, the commodity 2 is placed at a position in which a distance from the tag antenna 202 of the RFID tag 5 is a first distance $L_1$. The tag antenna 202 of the RFID tag 5 is placed at a position in which a distance from the strip conductor 43 is a second distance $L_2$.

Although only the distance relation of the commodity 2, the tag antenna 202 and the strip conductor 43 is shown in FIG. 8, in order to satisfy the above distance relation, when covering the RFID tag 5 with a plastic plate or the like, for example, the thickness of the plastic plate can be used. Specifically, by embedding the RFID tag 5 in a plastic plate and forming a sheet having the RFID tag using this plastic plate, it is possible to achieve the above-described first distance $L_1$.

Further, by disposing a spacer 44 below the RFID tags 5 as shown in FIGS. 4 to 6, it is possible to provide a board that supports the tags and also achieve the above-described second distance $L_2$. This technique is one way to achieve the first distance $L_1$ and the second distance $L_2$, and another technique may be used. For example, in order to achieve the second distance $L_2$, the strip conductor 43 and the tag antenna 202 may be spaced apart from each other by the distance $L_2$ on the same plane.

Effects by the relations of the components of the commodity management system according to this exemplary embodiment are described hereinafter in further detail with reference to FIGS. 7 and 8.

First, as shown in FIG. 7, in the commodity management system according to the exemplary embodiment of the present invention, the commodity 2 is placed above the tag antenna 202 of the RFID tag 5 at the first distance $L_1$. Further, the strip conductor 43 connected to the RFID reader 7 is placed below the RFID tag 5 at the second distance $L_2$ as the line-of-sight distance between the strip conductor 43 and the tag antenna 202. In this manner, in this commodity management system, the commodity 2 is placed in an area other than the area interposed between the reader waveguide 4 (the strip conductor 43) and the RFID tag 5. Thus, the line-of-sight between the reader waveguide 4 and the RFID tag 5 is not interrupted by the commodity 2.

As described above, in this commodity management system, it is preferred to adjust the first distance $L_1$ between the commodity 2 and the tag antenna 202 and the second distance $L_2$ being the line-of-sight distance between the tag antenna 202 and the reader waveguide 4 (the strip conductor 43). Further, in this commodity management system, it is preferred to adjust a coupling coefficient $k_2$ between the commodity 2 and the tag antenna 202 and a coupling coefficient $k_1$ between the tag antenna 202 and the reader waveguide 4 (the strip conductor 43) by adjusting the first distance $L_1$ and the second distance $L_2$. In this commodity management system, the signal intensity between the tag antenna 202 and the reader waveguide 4 is changed according to the coupling coefficient $k_2$ that varies depending on the presence or absence of the commodity 2, and the presence or absence of the commodity 2 is determined based on the change in signal intensity.

The relations among the first distance $L_1$, the second distance $L_2$, and the coupling coefficients $k_1$ and $k_2$, and effects of the commodity management system according to this exemplary embodiment based on those settings are described hereinbelow.

First, while electromagnetic coupling is used in this exemplary embodiment, the coupling coefficients that indicate the strength of the electromagnetic coupling can be relatively easily evaluated by an electromagnetic field simulator. Further, in the description of the electromagnetic coupling, when the wavelength of a radio signal between the tag antenna 202 and the reader waveguide 4 is $\lambda$, an area whose distance from a wave source (for example, waveguide) is shorter than $\lambda/2\pi$ ($\pi$ is a circular constant) is referred to as a reactive near-field, an area whose distance from the wave source is longer than $\lambda/2\pi$ and shorter than $\lambda$ is referred to as a radiative near-field, and these two areas are collectively referred to as a near-field region.

In this near-field region, the electromagnetic field exhibits complexity, and a quasi-static electromagnetic field, an induced electromagnetic field and a radiated electromagnetic field have non-negligible intensity ratios, and the vector obtained by synthesizing those fields changes in different ways spatially and temporally. As one example, in the case where the wave source is an infinitesimal dipole antenna, when an electric field E[V/m] and a magnetic field H[A/m] generated by this antenna are represented in spherical coordinate systems (r, $\theta$, $\phi$) and phasor representation, they can be represented by the following Expressions (1) to (4).

$$E_\theta = \frac{ql}{4\pi\varepsilon}\left\{\frac{1}{r^3} + \frac{1}{r^2} \cdot \frac{1}{(\lambda/2\pi)} \cdot e^{j\frac{\pi}{2}} + \frac{1}{r} \cdot \frac{1}{(\lambda/2\pi)^2} \cdot e^{j\pi}\right\} \cdot e^{-jkr} \cdot \sin\theta \qquad (1)$$

$$E_r = \frac{ql}{2\pi\varepsilon}\left\{\frac{1}{r^3} + \frac{1}{r^2} \cdot \frac{1}{(\lambda/2\pi)} \cdot e^{j\frac{\pi}{2}}\right\} \cdot e^{-jkr} \cdot \cos\theta \qquad (2)$$

$$H_\phi = \frac{ql}{4\pi\sqrt{\varepsilon\mu}}\left\{\frac{1}{r^2} \cdot \frac{1}{(\lambda/2\pi)} \cdot e^{j\frac{\pi}{2}} + \frac{1}{r} \cdot \frac{1}{(\lambda/2\pi)} \cdot e^{j\pi}\right\} \cdot e^{-jkr} \cdot \sin\phi \qquad (3)$$

$$E_\phi = H_\theta = H_r = 0 \qquad (4)$$

In the above Expressions (1) to (4), charges stored in the infinitesimal dipole antenna is q[C], the length of the antenna is l[m], the wavelength is $\lambda$[m], and a distance from the wave source to an observation point is r[m]. Further, $\pi$ is a circular constant, $\in$ is a dielectric constant, and $\mu$ is a magnetic permeability. In the above Expressions (1) to (4), the term proportional to $1/r^3$ is the quasi-static electromagnetic field, the term proportional to $1/r^2$ is the induced electromagnetic field, and the term proportional to $1/r$ is the radiated electromagnetic field. Since these electromagnetic field components have different dependencies on the distance r, the relative intensity changes depending on the distance r.

FIG. 9 shows a table showing dependencies on the distance r standardized by the wavelength λ for the relative intensity of the quasi-electrostatic field, the induced electric field, and the radiated electric field in an electric field $E_\theta$. Note that the second row of the table in FIG. 9 shows the distances converted by the free space wavelength of 950 MHz, which is substantially the same as the frequency of the UHF' (Ultra High Frequency)-band RFID allowed in the Japanese Radio Act.

As is obvious from the table shown in FIG. 9, when the distance r increases, the intensity of each of the electric fields becomes small, and each component ratio changes accordingly. For example, in the region of $r<\lambda/2\pi$, the quasi-electrostatic field has the greatest intensity, the induced electric field has the next greatest intensity, and the radiated electric field has the least intensity, and in the region of $r>\lambda/2\pi$, the quasi-electrostatic field has the least intensity, the induced electric field has the next least intensity, and the radiated electric field has the greatest intensity. Further, in the region of $r>\lambda$, the contributions of the quasi-electrostatic field and the induced electric field are extremely small, and in a far field, which is the region of $r>2\lambda$, only the radiated electric field component substantially makes a contribution. On the other hand, in the region of $r<\lambda$, the quasi-electrostatic field and the induced electric field still sufficiently make contributions, and in the reactive near-field of $r<\lambda/2\pi$, the quasi-electrostatic field and the induced electric field make great contributions.

Further, as shown in Expressions (1) to (4), in contrast to the fact that the radiated electric field in a faraway field ($r>>\lambda/2\pi$) include θ-direction components only, the quasi-static electromagnetic field and the induced electric field include r-direction components and φ-direction components in addition to θ-direction components, thus having components in various directions. In general, in such a reactive near-field, compared to the radiated electromagnetic field that is radiated into the space from the antenna and propagates through the space, the quasi-static electromagnetic field and the induced electromagnetic field that remain near the antenna (waveguide) are dominant, and the absolute electromagnetic field intensity is also high. In the radiative near-field, the absolute electromagnetic field intensity generally becomes lower with an increase in the distance from the wave source. Further, the relative intensity of the quasi-static electromagnetic field and the induced electromagnetic field becomes abruptly lower with an increase in the distance from the wave source. As a result, the relative intensity of the radiated electromagnetic field to the other electromagnetic fields becomes higher. As described above, in the near-field region, the quasi-static electromagnetic field and the induced electromagnetic field exist, and, the existence of those electromagnetic fields causes coupling between the reader waveguide 4 and the tag antenna 202 and coupling between the tag antenna 202 and the commodity 2.

In a passive RFID system that uses a normal UHF band or a microwave band, the distance r between the reader antenna corresponding to the reader waveguide 4 and the tag antenna satisfies the relation of $r>\lambda$, and the radiated electromagnetic field is used for the communication. In order to efficiently generate the radiated electromagnetic field, a resonant antenna such as a patch antenna is often used as the reader antenna. When such a resonant antenna is used in the near-field region of $r<\lambda$, the electromagnetic field intensity greatly varies depending on the location due to the standing waves in the resonant antenna. For example, the amplitude becomes the largest near the anti-node of the standing wave, and the amplitude becomes 0 at the node of the standing wave. Accordingly, when the distance r between the reader antenna and the tag antenna using such a resonant antenna satisfies the relation of $r<\lambda$, the tag antenna cannot receive signals from the reader antenna or the reception signal intensity becomes extremely low at a position near the midpoint of the standing wave in the reader antenna in some cases. In other words, a dead area is created, which can adversely affect the usage.

On the other hand, the antennas may be electromagnetically coupled through the quasi-state electromagnetic field and the induced electromagnetic field existing in the near-field region of $r<\lambda$, or more preferably in the reactive near-field of $r<\lambda/2\pi$ to thereby form a coupled circuit. In this case, there is no need for a wide space between the RFID reader and the RFID tag according to the condition. However, if the resonant antenna is merely used instead of the reader waveguide 4, a dead area is created, which can adversely affect the usage.

In view of the above, in the commodity management system according to this exemplary embodiment, the reader waveguide 4 to be connected to the RFID reader 7 is formed as the open transmission line terminated with matching impedance, and the RFID tag 5 is placed so that the open transmission line and the tag antenna 202 of the RFID tag 5 are electromagnetically coupled. In this commodity management system, with use of the open transmission line that emits less electric waves as the reader waveguide 4 of the RFID reader 7, the reader waveguide 4 and the tag antenna 202 are electromagnetically coupled through the quasi-static electromagnetic field and the induced electromagnetic field that are mainly generated around the open transmission line, thereby forming a coupled circuit. In other words, the open transmission line is used as a traveling wave antenna that operates in the near-field region. In this structure, there is no need to provide a wide space between the reader waveguide 4 and the RFID tag 5.

Further, because the communication between the reader waveguide 4 and the tag antenna 202 is carried out at a short distance through the coupled circuit, it is possible to suppress the occurrence of multipath phenomenon and false detection caused by a person or an object interposed between the reader waveguide 4 and the place where the commodity 2 is placed. Further, because the open transmission line terminated with matching impedance is used as the reader waveguide 4, the main components of the electromagnetic waves propagating through the antenna do not generate standing waves and propagate to the end terminated with matching impedance. Not generating standing waves strictly means that standing waves are sufficiently small, and usually means that the standing wave ratio is two or less.

Note that, in the case where the place to put the tag antenna 202 is restricted or in the case where the range where the tag antenna 202 operates effectively can be large to be able to ignore the effect of the node in standing wave components, larger standing waves may be used.

When the transmission line is terminated with sufficient matching accuracy, or when the electromagnetic waves propagating through the transmission line are sufficiently attenuated near the end, large standing waves are not generated in the transmission line and traveling waves serve as main components. The electromagnetic field distribution in such a transmission line can be used. In the electromagnetic field formed in the space around this line, the range of radiated electromagnetic field is relatively small, and the static electromagnetic field and the induced electromagnetic field serve as main components. The electromagnetic field intensity of the static electromagnetic field and the induced electromagnetic field is higher than the intensity of the radiated electromagnetic field, and even when the reader operates at the same power, the electromagnetic field intensity obtained by the RFID tag 5 is high. In other words, it is possible to prevent the radiated electromagnetic field that deteriorates the surrounding electromagnetic environment from appearing while ensuring the proper operation of the tags.

In the standing wave antenna such as a patch antenna that is commonly used, the electromagnetic field distribution around the antenna is extremely uneven according to the distribution of standing waves inside the antenna, and in order to avoid the dead area, the area where the commodity 2 can be managed needs to be limited. On the other hand, in the case of the reader waveguide formed as the open transmission line described in this exemplary embodiment, even near the waveguide, a part that does not change such as the node of standing waves does not exist in the electromagnetic field distribution, and it is thus possible to obtain necessary signal intensity all over the place. Thus, in the near-field region as well, there is no significant unevenness of the electromagnetic field along the waveguide (antenna), and the area where the tag information of the RFID tag 5 cannot be read hardly appears. Thus, the flexibility of placing the reader waveguide 4 and the tag antenna 202 increases.

Further, in the commodity management system according to this exemplary embodiment, because the communication is performed through the electromagnetic coupling between the reader waveguide 4 and the tag antenna 202 using the traveling waves as signals, a dead area is not likely to appear in contrast to the resonant antenna, and it is thus possible to create the situation where there is no adverse effects on the usage. Therefore, the detection unit extends the transmission line, regardless of the wavelength, within the range where the intensity of the quasi-static electromagnetic field and the induced electromagnetic field generated around the open transmission line is high enough for the RFID tag 5 to operate, and it is thereby possible to widen the coverage area. Thus, in the commodity management system according to this exemplary embodiment, by use of the aforementioned open transmission line, it is possible to suppress the radiation loss of power and easily enlarge the coverage area.

The open transmission line in this specification is basically a transmission line that aims to suppress radiation and transmit electromagnetic waves in the longitudinal direction of the line, and it is an open line where the space between the line and the RFID tag 5 is not completely covered with metal in order to allow electromagnetic coupling to the RFID tag 5. As an example, the open transmission line may be a balanced two-wire transmission line or transmission lines similar to it, a transmission line such as a microstrip line, a coplanar line or a slot line, a grounded coplanar line or a triplate line, which are variations of those transmission lines. Alternatively, even in a strip line, the RFID tag 5 may be interposed between a ground conductor and a strip conductor, and the ground conductor may be provided with an appropriate open structure. Further, the open transmission line may be, although it depends on the condition for use, a plane-shaped (two-dimensional) antenna that transfers signals by changing the electromagnetic field to propagate between the narrow area interposed between a mesh-shaped conductor part and a sheet-shaped conductor part and the near-field leakage region outside of the mesh-shaped conductor part. On the other hand, a shield transmission line that does not generate such an electromagnetic field around the transmission line such as a coaxial cable or a waveguide tube that shields the transmission line cannot be used.

The traveling wave antenna that aims to perform electromagnetic radiation in a far field using so-called a crank-line antenna, a meander line antenna or a leaky coaxial cable that obtains a constant radiated electromagnetic field intensity by designing the crank shape for the radiation of electromagnetic waves from the open transmission line or actively using a higher-order mode is different from the open transmission line that is used for the commodity management system according to this exemplary embodiment. Since, in those traveling wave antennas, the radiation of electromagnetic waves preferentially occurs from cranks or slots periodically provided with a size of wavelength, which is a size of 1/10 or more of the wavelength in general, the intensity of the electromagnetic field greatly varies depending on the place, which is similar to the resonant antenna described earlier. Thus, when used in the near-field region, reading of tag information becomes unstable or the tag cannot be read out in some places, which adversely affects the usage. Further, in the UHF-band RFID system, allocated frequencies are different in different countries and are generally distributed in the bandwidth of about 860 to 960 MHz, and this corresponds to a bandwidth ratio of about 10%, thus requiring serious changes to the design of the resonance point of the resonant antenna or the cycles of the cranks, the meanders, and the slots. On the other hand, in the commodity management system according to this exemplary embodiment, the open transmission line originally having an extremely wide bandwidth is used, and it is thereby possible to use the same antenna as the reader waveguide 4 without any special changes.

Further, in the commodity management system according to this exemplary embodiment, the display position 2a for placing the commodity 2 is provided near the RFID tag 5 so that the commodity 2 and the tag antenna 202 of the RFID tag 5 are electromagnetically coupled. Thus, when there is the commodity 2, the commodity 2 and the tag antenna 202 form the coupled circuit, and therefore the resonance frequency of the tag antenna 202 changes or the feed-point impedance of the tag antenna 202 changes compared to the case where there is no commodity 2. The tag antenna 202 is created to resonate at a frequency of a signal to be used for the communication in the free space, and further the feed-point impedance of the tag antenna 202 is adjusted to maximize the reception sensitivity. Thus, the above-described changes decrease the reception sensitivity and causes adverse effects on the operation of the tag antenna 202 when transmitting a reflected signal to the RFID reader 7. As a result, the power reception sensitivity for a signal to be used for the communication decreases. Further, the transmission power of a signal reflected by the RFID tag 5 also decreases. Accordingly, the RFID tag 5 cannot receive a signal from the RFID reader 7, the received power intensity of a signal is too low to secure the operating power of the tag, or the tag cannot generate a reflected electromagnetic field with sufficient intensity. As a result, the RFID reader 7 can no longer read the tag information of the RFID tag 5. Alternatively, the intensity or the phase of the reflected electromagnetic field that reaches the RFID reader 7 largely varies with a change in the resonance frequency of the tag or the like. Thus, when the commodity 2 is at the display position 2a, the tag information cannot be read, or the intensity of the reflected electromagnetic field from the RFID tag 5 largely varies compared to the case where there is no commodity 2, and therefore the commodity management system can detect the presence of the commodity 2. Stated differently, as a result that a change has occurred in the operating characteristics of the tag antenna 202 depending on the presence or absence of the commodity 2, the RFID reader 7 can detect a change in the intensity of a reflected signal from the RFID tag 5, and, based on this detection result, the commodity management system according to this exemplary embodiment can detect the presence or absence of the commodity.

The configuration of the store management device 1 according to this exemplary embodiment is described hereinafter with reference to FIG. 10. In the exemplary configuration shown in FIG. 10, the store management device 1 includes a commodity information database 11, a space planning table creation unit 12, a tag position table creation unit 13, a commodity management table creation unit 14, a tag reading unit 15, a commodity presence/absence determination unit 16, and a commodity management unit 17.

Note that, although those blocks are described as the functions of the store management device 1 in this example, some or all of those blocks may be included in the RFID reader 7, and necessary information may be transmitted from the RFID reader 7 to the store management device 1. Further, the configuration of the functional blocks is by way of illustration only, and another configuration may be employed as long as the commodity management according to this exemplary embodiment, which is described later, can be achieved.

For example, the store management device 1 includes a commonly used computer device (server device). The store management device 1 includes a central processing unit (CPU), a storage device such as a memory or a hard disk, an input device such as a keyboard, a display device such as a liquid crystal display, and a communication unit to be connected to a communication network 3. The storage device stores a commodity management program for implementing commodity management processing according to this exemplary embodiment, and the CPU executes this program to implement each functional block. Note that the store management device 1 is not limited to a single computer, and it may be composed of a plurality of computers.

The commodity management program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

Figure 12:
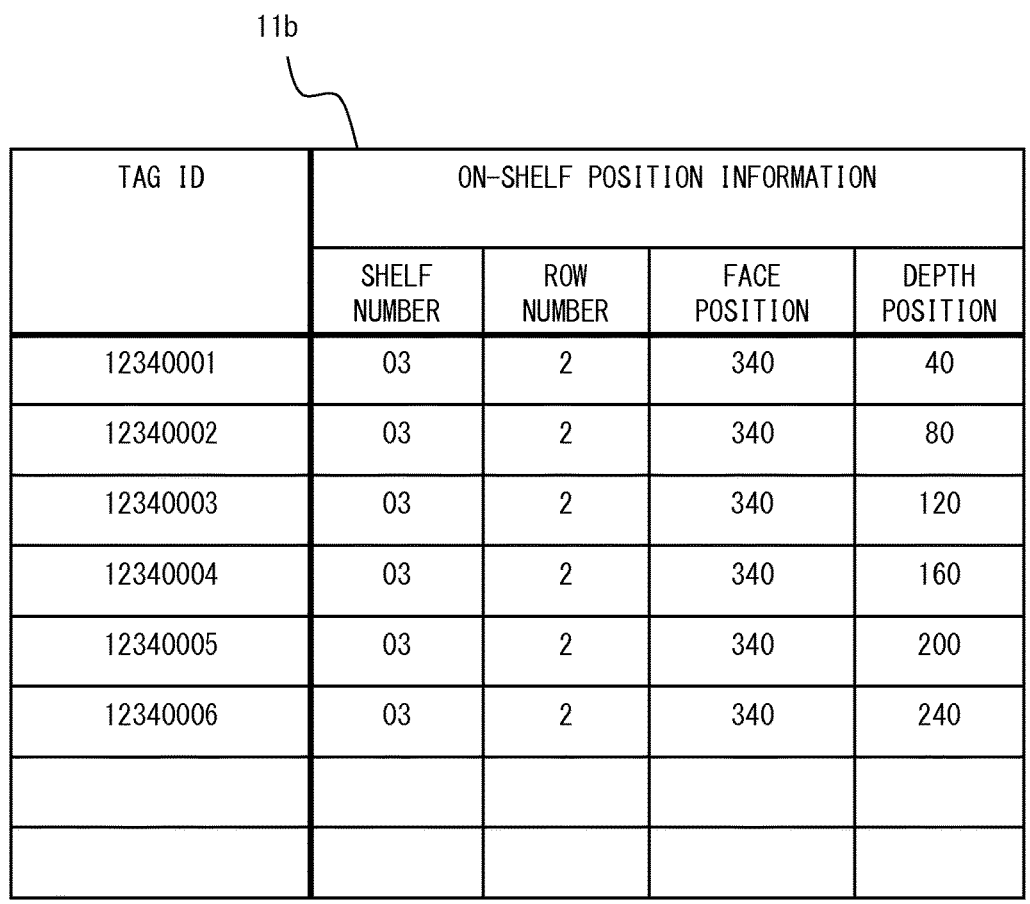
FIG. 12 is a view showing an example of data stored in the store management device according to the first exemplary embodiment.

The commodity information database 11 stores commodity information related to the commodity 2 displayed on the commodity display shelf 8. In this exemplary embodiment, the commodity information database 11 includes a space planning table 11a, a tag position table 11b, and a commodity management table 11c. Specifically, the commodity information database 11 includes a space planning table storage unit that stores the space planning table 11a, a tag position table storage unit that stores the tag position table 11b, and a commodity management table storage unit that stores the commodity management table 11c. FIG. 11 shows one example of the space planning table 11a, FIG. 12 shows one example of the tag position table 11b, and FIG. 13 shows one example of the commodity management table 11c.

The space planning table 11a is one example of the article position table, and it stores display position information (space planning information) of commodities on a shelf in association with commodity information. For example, as shown in FIG. 11, the space planning table 11a associates a commodity name, a manufacturer, a commodity size, and space planning information. The commodity name, the manufacturer and the commodity size are identification information (commodity information) that identifies a commodity to be placed on the shelf. The commodity name is a selling name of a commodity, which is commodity specifying information that specifies a commodity. When there are different commodities (flavor, size etc.) with the same selling name, they may be further divided by flavor or the like. The manufacturer is a name of a manufacturer or a dealer of a commodity, which also serves as group information that associates different commodities. The group information is not limited to a manufacturer, and another group information such as a type of food may be used.

The commodity size is a size of the outer shape of a commodity, and it includes width, height and depth, for example. The commodity size is also a placement size that occupies an area on the shelf when the commodity is placed. A size of the display position (placement area) of a commodity can be specified based on the width (the length in the horizontal direction of the shelf) and the depth (the length from the front to the back of the shelf) of the commodity.

The space planning information is the display position (placement position or assigned position) on the shelf (commodity displayable area 2b) which is assigned to each commodity by space planning, and it contains a shelf number, a row number, a face, and a quantity in depth, for example. The shelf number (board number) is information that identifies a commodity display shelf board (gondola) located in a store. The row number is information that identifies a row of the shelf provided in the commodity display shelf board (gondola). The face is information that identifies an arrangement position (face position), which is a position in the front row of the shelf. Note that, in addition to the face position of commodities, a quantity in face that indicates the number of faces (number of columns) to place the same commodities may be used. The quantity in depth is information indicating the number of the same commodities to be placed in a face (column) from the front to the back of the shelf. The space planning information specifies where on which shelf and how many commodities to be placed, and the whole placement area of one commodity can be specified by the space planning information and the commodity size.

The first example of data in FIG. 11 shows that the commodity with the commodity name "canned tuna" by the manufacturer "AAA" has the commodity size "70 mm in width, 30 mm in height and 70 mm in depth" and is assigned so that the six commodities in depth are placed in the 340th column (face) on the second row of the shelf board with the shelf number "03" by space planning.

As shown in FIG. 12, the tag position table 11b is a table that stores display position information of RFID tags on the shelf in association with the tag ID of RFID tags. The tag ID (tag information) is identification information that is assigned to each RFID tag 5 and stored by the RFID tag 5 in advance. The position information of RFID tags on the shelf is a fixed position that is fixed in advance on the shelf (commodity displayable area 2b), and it contains a shelf number, a row number, a face position, and a depth position. Like the space planning information in FIG. 11, the shelf number (board number) identifies a commodity display shelf board (gondola), the row number identifies a row of the shelf, the face position identifies the arrangement position on the shelf, and the depth position indicates the position in the depth direction from the front of a face (column).

The first example of data in FIG. 12 shows that the RFID tag with the tag ID "12340001" is fixedly placed in the position at 40 mm from the front in the 340th column (face) on the second row of the shelf board with the shelf number "03".

The commodity management table 11c is one example of the article management table, and it stores the state of commodities by associating the RFID tag with each commodity information. Further, this table further associates the position of each commodity according to need. Because the position of a commodity can be known from the space planning table 11a in some cases, it may be omitted. For example, as shown in FIG. 13, the commodity management table 11c associates a commodity name, a manufacturer, space planning information (position information), a tag ID, and the presence or absence of a commodity. The commodity name and the manufacturer are identification information of a commodity, and they correspond to the commodity name and the manufacturer contained in the space planning table 11a. The space planning information is position information (placement information) of each commodity, and it corresponds to the space planning information contained in the space planning table 11a. For example, just like the space planning information in FIG. 11, the space planning information contains a shelf number, a row number, a face, and order in depth. Although the space planning information in FIG. 11 contains the quantity in depth because space planning is done for a plurality of commodities together, the space planning information in FIG. 13 contains the order of depth, which is the order from the front to the back of a face (column) because each commodity are identified. Note that a plurality of commodities and a plurality of tag ID may be associated together if the commodities and the tag ID can be associated. The tag ID is identification information of an RFID tag, and it corresponds to the tag ID contained in the tag position table 11b. The presence or absence of a commodity is commodity display (placement) status information indicating whether a commodity is displayed (placed) on the RFID tag 5, and it shows a detection result of the RFID tag 5.

The first example of data in FIG. 13 shows that, among the commodities with the commodity name "canned tuna" by the manufacturer "AAA", the commodity that is allocated by space planning to the order of depth "1" in the 340th column (face) on the second row of the shelf board with the shelf number "03" corresponds to the position of the RFID tag with the tag ID "12340001" and that this commodity is currently not displayed at this position from the detection result of the RFID tag with the tag ID "12340001". Further, the second example of data in FIG. 13 shows that, among the commodities with the commodity name "canned tuna" by the manufacturer "AAA", the commodity that is allocated by space planning to the order of depth "2" in the 340th column (face) on the second row of the shelf board with the shelf number "03" corresponds to the positions of the two RFID tags with the tag ID "12340002" and "12340003" and that this commodity is currently displayed at this position from the detection result of the RFID tags with the tag ID "12340002" and "12340003".

Figure 10:
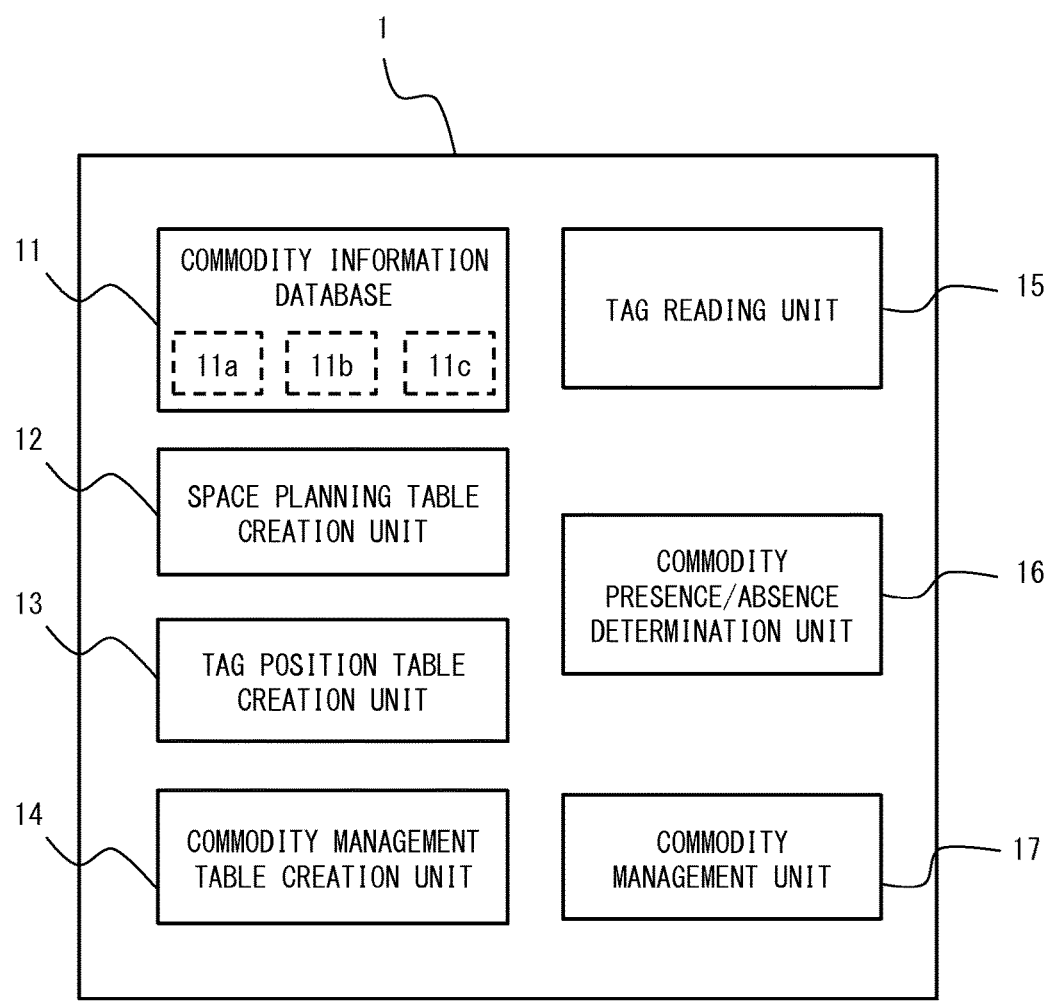
FIG. 10 is a block diagram showing the configuration of a store management device according to the first exemplary embodiment.

The elements in FIG. 10 are further described hereinbelow. The space planning table creation unit 12 creates the space planning table 11a and stores the created space planning table 11a into the commodity information database 11. The space planning table creation unit 12 is configured using commonly used space planning software (space planning program), and runs the space planning software and thereby creates the space planning table 11a. For example, the space planning table creation unit 12 creates the space planning table 11a by receiving input of commodity information such as a commodity name, a manufacturer and a commodity size from commodity master data and input of fixture information such as a position, a size and the like of a commodity display shelf board (gondola) and a commodity display shelf from fixture master data, and then performing space planning according to user operation, sales trend, season, campaign and the like.

Note that the space planning table 11a may be input to the store management device 1 from the outside, without being created in the store management device 1. For example, a head office that consolidates the management of a plurality of retail stores may create the space planning table 11a using space planning software and input it to the store management device 1 of each retail store. Specifically, the space planning table creation unit 12 may be a space planning table acquisition unit that acquires (receives) the space planning table 11a from the outside and stores the acquired space planning table 11a into the commodity information database 11.

The tag position table creation unit 13 creates the tag position table 11b and stores the created tag position table 11b into the commodity information database 11. Tag ID and position information of RFID tags placed on the shelf are input to the tag position table creation unit 13, and the tag position table creation unit 13 creates the tag position table 11b by associating the tag ID and the position information.

For example, on-shelf position information may be displayed in the area to place an RFID tag, and a tag ID may be displayed on the RFID tag, and a user may read the position information and the tag ID of the RFID tag by visual inspection and input the read position information and the tag ID to the store management device 1. As another example, a barcode indicating on-shelf position information may be displayed in an area to place an RFID tag, a barcode indicating a tag ID may be displayed on an RFID tag, and the position information and the tag ID of the RFID tag may be sequentially read using a barcode reader, and the read position information and tag ID may be input to the store management device 1. As yet another example, a shelf on which an RFID tag is placed may be photographed by a camera or the like, and the position and the tag ID of the RFID tag may be acquired by performing image processing.

Note that the tag position table 11b may be input to the store management device 1 from the outside, without being created in the store management device 1. For example, the tag position table creation unit 13 may be a tag position table acquisition unit that acquires (receives) the tag position table 11b corresponding to the placement of RFID tags and stores the acquired tag position table 11b into the commodity information database 11.

The commodity management table creation unit 14 creates the commodity management table 11c based on the space planning table 11a and the tag position table 11b, which is, according to the relationship between the space planning information in the space planning table 11a and the position information in the tag position table 11b, and stores the created commodity management table 11c into the commodity information database 11. The commodity management table creation unit 14 calculates an area (placement area) in a commodity display position from the commodity size and the space planning information in the space planning table 11a. Then, the commodity management table creation unit 14 determines the RFID tag that is located in the calculated area in the commodity display position from the tag position information in the tag position table 11b. Further, the commodity management table creation unit 14 associates the determined RFID tag and the commodity and thereby creates the commodity management table 11c.

Note that, instead of automatically creating the commodity management table 11c from the space planning table 11a and the tag position table 11b, the commodity management table 11c may be created based on the association between commodities and RFID tags that is input from the outside.

For example, position information may be displayed in an area on a shelf, commodity information may be displayed on a commodity, and a tag ID may be displayed on an RFID tag, and a user may read the position information, the commodity information and the tag ID of the commodity by visual inspection and inputs the read position information, commodity information and tag ID to the store management device 1 and thereby the create commodity management table 11c. As another example, a barcode indicating position information may be displayed in an area on a shelf, a barcode (for example, JAN code) indicating commodity information may be displayed on a commodity, and a barcode indicating a tag ID is displayed on an RFID tag, and the position information, the commodity information and the tag ID of the commodity may be sequentially read using a barcode reader, and the read position information, commodity information and tag ID may be input to the store management device 1 to thereby create the commodity management table 11c.

The tag reading unit 15 reads the RFID tags 5 on the reader waveguide 4 through the RFID reader 7. For example, the tag reading unit 15 may transmit a bulk read command for reading all tags to the RFID reader 7, and the RFID reader 7 may read all of the RFID tags 5 on the reader waveguide 4 at a time.

An allocated frequency band for reading RFID tags is restricted by Radio Law of each country. Thus, a reading rate is limited to about several hundred tags per second. Therefore, if a large number of RFID tags are placed on the reader waveguide 4 and all of them are read, the reading rate becomes low, and it takes a long time to detect commodities. To avoid this, in this exemplary embodiment, it is preferred to read only the RFID tags necessary for detection of commodities. Specifically, the tag reading unit 15 reads only the RFID tags with the tag ID stored in the commodity management table 11c. The tag reading unit 15 transmits an individual read command indicating the corresponding tag ID to the RFID reader 7, and the RFID reader 7 reads the corresponding RFID tags 5 on the reader waveguide 4.

The commodity presence/absence determination unit 16 is one example of the article presence/absence determination unit and determines the presence or absence (display status) of the commodity on the commodity display shelf 8 corresponding to the RFID tag 5 according to the signal received from the RFID tag 5 based on the commodity management table 11c. As described above, the commodity presence/absence determination unit 16 receives the intensity or the like of the signal received from the RFID tag 5 by the RFID reader 7, and when the signal is interrupted or the signal intensity is lower than a certain threshold, determines that there is a commodity on the commodity display shelf 8 corresponding to the RFID tag 5 in the commodity management table 11c, and when the signal intensity is equal to or higher than the threshold, determines that there is no commodity on the commodity display shelf 8. Further, the commodity presence/absence determination unit 16 sets the determined status of the presence or absence of a commodity to the commodity management table 11c. The threshold to determine the signal intensity may be a value that is predetermined in the design phase of the commodity management system. Further, the signal intensity when there is no commodity may be measured, and this measured value or a value lower than the measured value may be set as the threshold.

The commodity management unit 17 performs necessary processing such as notification to a store clerk according to the detected presence or absence of the commodity. For example, the commodity management unit 17 displays the commodity display shelf and the commodity placement area and further displays the detected status of the presence of absence of the commodity by GUI or the like on the display device. Further, the commodity management unit 17 may determine that it is necessary to replenish the commodities when the number of commodities falls below a specified number, and notify the replenishment of the commodities to a store clerk. When there is no commodity in the front row of the shelf, the commodity management unit 17 may determine that it is necessary to correct the display and notify the correction of display to a store clerk.

A commodity management method (article management method) that is performed in the commodity management system according to this exemplary embodiment is described hereinafter with reference to FIG. 14.

Figure 14:
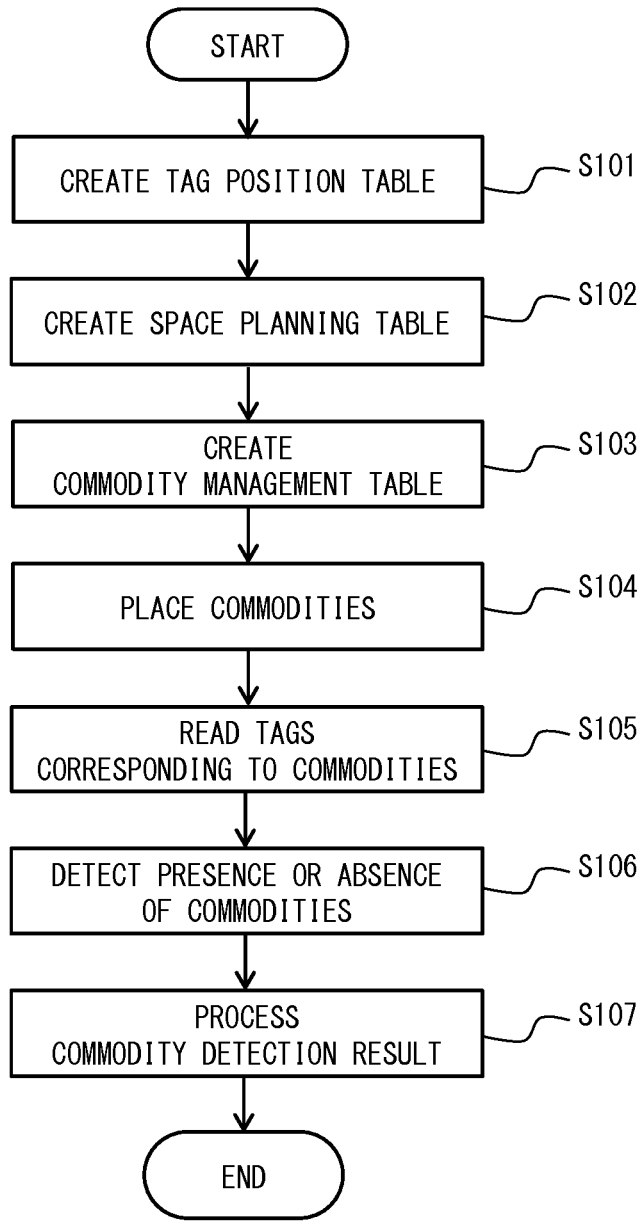
FIG. 14 is a flowchart showing a commodity management method according to the first exemplary embodiment.

As shown in FIG. 14, the tag position table creation unit 13 first creates the tag position table 11b by associating the tag ID of the RFID tag and the position information of the RFID tag (S101). The tag position table creation unit 13 acquires the position of the RFID tag placed on the shelf in advance by user input, a barcode reader or the like and thereby creates the tag position table 11b.

Next, the space planning table creation unit 12 creates the space planning table 11a by associating the commodity information and the space planning information (S102). The space planning table creation unit 12 performs space planning by using space planning software at the timing such as every season or each campaign and thereby creates the space planning table 11a. Alternatively, the space planning table creation unit 12 acquires the space planning table 11a created in advance from the outside.

Then, the commodity management table creation unit 14 creates the commodity management table 11c by associating the commodity information and the tag ID of the RFID tag (S103). When the space planning table 11a is created or acquired, the commodity management table creation unit 14 refers to the space planning table 11a and the tag position table 11b and thereby creates the commodity management table 11c for detecting the presence or absence of a commodity. The commodity management table creation unit creates the commodity management table 11c automatically based on the space planning table 11a and the tag position table 11b, or creates the commodity management table 11c by receiving input the position of the RFID tag corresponding to the commodity by user input, a barcode reader or the like.

Figure 15:
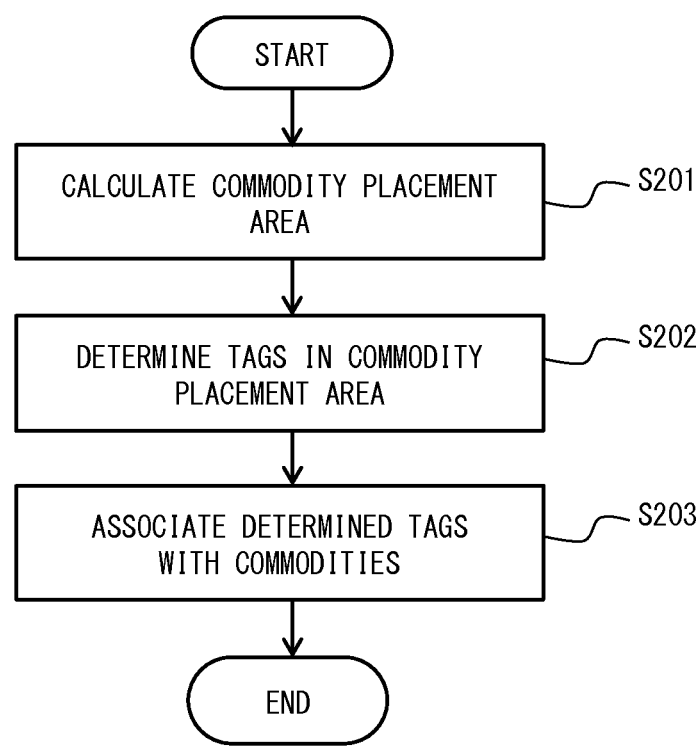
FIG. 15 is a flowchart showing a method of creating a commodity management table according to the first exemplary embodiment.

FIG. 15 shows a specific example in the case of automatically creating the commodity management table in S103. First, the commodity management table creation unit 14 refers to the space planning table 11a and calculates the area (placement area) of the display position of a commodity according to a commodity size and space information (S201). For example, in the example of FIG. 11, the placement area of each commodity can be calculated by the width and depth of the commodity size, and further, the placement area in the face (column) can be calculated by multiplying the quantity in depth in the space planning information. Further, the placement area may be specified in consideration of the shape of the bottom surface that comes into contact when a commodity is placed. The shape of the bottom surface is stored for each commodity in the space planning table 11a, and if the shape of the bottom surface is a circle, the area of the circle is calculated to thereby obtain the placement area.

Next, the commodity management table creation unit 14 refers to the tag position table 11b and determines the RFID tag corresponding to the calculated area (placement area) of the display position of the commodity (S202). The commodity management table creation unit 14 compares the area of the display position of the commodity calculated in S201 with the position information of the tag in the tag position table 11b and selects the RFID tag included in the area of the commodity display position. For example, in the examples of FIGS. 11 and 12, the RFID tag where the shelf number, the row number and the face match and the depth position is included in the area of the commodity display position is selected.

Then, the commodity management table creation unit 14 associates the determined RFID tag with the commodity and thereby creates the commodity management table 11c (S203). The commodity management table creation unit 14 acquires the tag ID of the RFID tag determined in S202 from the tag position table 11b, acquires the commodity name, the manufacturer and the space planning information of the commodity corresponding to the RFID tag from the space planning table 11a, and stores them into the commodity management table 11c in association with one another. For example, in the examples to FIGS. 11 to 13, because the position of the RFID tag with the tag ID "12340001" is included in the area with the order of depth "1" among the areas where the six commodities "canned tuna" are placed, and therefore the commodity "canned tuna" with the order of depth "1" and the tag ID "12340001" are associated. Further, because the positions of the RFID tags with the tag ID "12340002" and "12340003" are included in the area with the order of depth "2" among the areas where the six commodities "canned tuna" are placed, and therefore the commodity "canned tuna" with the order of depth "2" and the tag ID "12340002" and "12340003" are associated.

After the commodity management table 11c is created in S103 of FIG. 14, a store clerk or the like places the commodity in the placement area on the RFID tag for commodity management (commodity detection) (S104). Then, the following processing is repeated to periodically monitor the presence or absence of the commodity.

First, the tag reading unit 15 reads the RFID tag through the reader waveguide 4 (S105). In this example, the RFID tag corresponding to the commodity display position is read in order to reduce the time to read the RFID tag. Specifically, the tag reading unit 15 specifies the tag ID in the commodity management table 11c one by one and transmits an individual read command to the RFID reader 7, and the RFID reader 7 outputs a signal one by one to the specified RFID tag 5 so as to send the tag ID back. When the number of RFID tags placed is small or the reading rate can be low, all tags may be read at a time.

Then, the commodity presence/absence determination unit 16 determines the presence or absence of the commodity corresponding to the RFID tag 5 according to the signal received from the RFID tag 5 based on the commodity management table 11c (S106). The RFID reader 7 receives the signal sent back from the RFID tag 5 specified one by one (or specified at a time) in S105 and measures the signal intensity, and outputs the measurement result to the store management device 1. The commodity presence/absence determination unit 16 detects whether the tag with the tag ID contained in the commodity management table 11c is read, or whether the signal intensity of the RFID tag with the corresponding tag ID is equal to or more than a threshold or less than the threshold. By referring to the commodity management table 11c, it is determined that there is a commodity corresponding to the RFID tag when the RFID tag is not read or the signal intensity is less than the threshold. Otherwise, it is determined that there is no corresponding commodity. For example, when one commodity and a plurality of RFID tags correspond, it may be determined that there is a commodity when the signal intensity of all of the plurality of RFID tags is less than the threshold or when the signal intensity of any of the plurality of RFID tags is less than the threshold. Further, it may be determined that there is no commodity when the signal intensity of all of the plurality of RFID tags is equal to or more than the threshold or when the signal intensity of any of the plurality of RFID tags is equal to or more than the threshold. Because the signal intensity of RFID tags varies depending on the material or the like of a commodity to be placed, it is preferred to set conditions for determination on a plurality of RFID tags in accordance with a commodity to be placed.

After that, the commodity management unit 17 performs processing according to the commodity detection result (S107). For example, the commodity management unit 17 displays the presence or absence of the commodity detected in S105 on the display unit and thereby notifies the status of the commodity to a store clerk.

As described above, according to this exemplary embodiment, the space planning table associating commodity information and store planning information and the tag position table associating a tag ID of an RFID tag and position information of the RFID tag are stored, and further, the commodity management table associating the commodity information and the tag ID of the RFID tag based on the space planning table and the tag position table is stored. By referring to the commodity management table, the presence or absence of the commodity on the RFID tag is determined. Thus, even when the display position of a commodity is changed by space planning, the presence or absence of the commodity can be determined simply by changing the space planning table and the commodity management table. There is thus no need to change the placement of the RFID tag, and it is thereby possible to manage articles easily.

If an integrated unit with a shelf board size on which RFID tags are placed according to the placement of commodities is provided, costs are high and it is not possible to deal with a slight change. In this exemplary embodiment, on the other hand, there is no need to change a unit including RFID tags, and it is thus possible to reduce costs and flexibly deal with various commodity placement.

Particularly, by placing a larger number of tags than articles, the tags with a smaller size than the bottom surface of an article or the interval of placing articles, and placing a larger number of RFID tags than the articles so that a plurality of tags are placed at a position to place one article to be managed, it is possible to reliably manage articles, even when the position to place an article is changed, simply by detecting whether the tag at that position can be read.

Further, by sequentially reading only the RFID tags in the commodity management table, it is possible to reliably avoid the collision of signals from the RFID tags and thereby prevent a decrease in reading rate due to a failure in reading caused by the collision.

Further, according to this exemplary embodiment, the presence or absence of a commodity is determined based on the signal intensity from an RFID tag on the reader waveguide. It is thus not necessary to put an RFID tag or a shielding part on a commodity, and it is possible to manage the presence or absence of a commodity at low costs.

Second Exemplary Embodiment

A second exemplary embodiment is described hereinafter with reference to the drawings. This exemplary embodiment shows an example in which a metal foil sheet is placed on the reader waveguide and the RFID tag (tag antenna unit) in the first exemplary embodiment.

In the first exemplary embodiment, a large number of RFID tags are placed in advance on the reader waveguide in order to easily manage commodities even when the placement of the commodities is changed. However, if a large number of RFID tags are placed, a reading rate decreases. In this exemplary embodiment, an unnecessary part is covered with the metal foil sheet, so that tags that do not need to be read are covered to be unable to be read.

Figure 16:
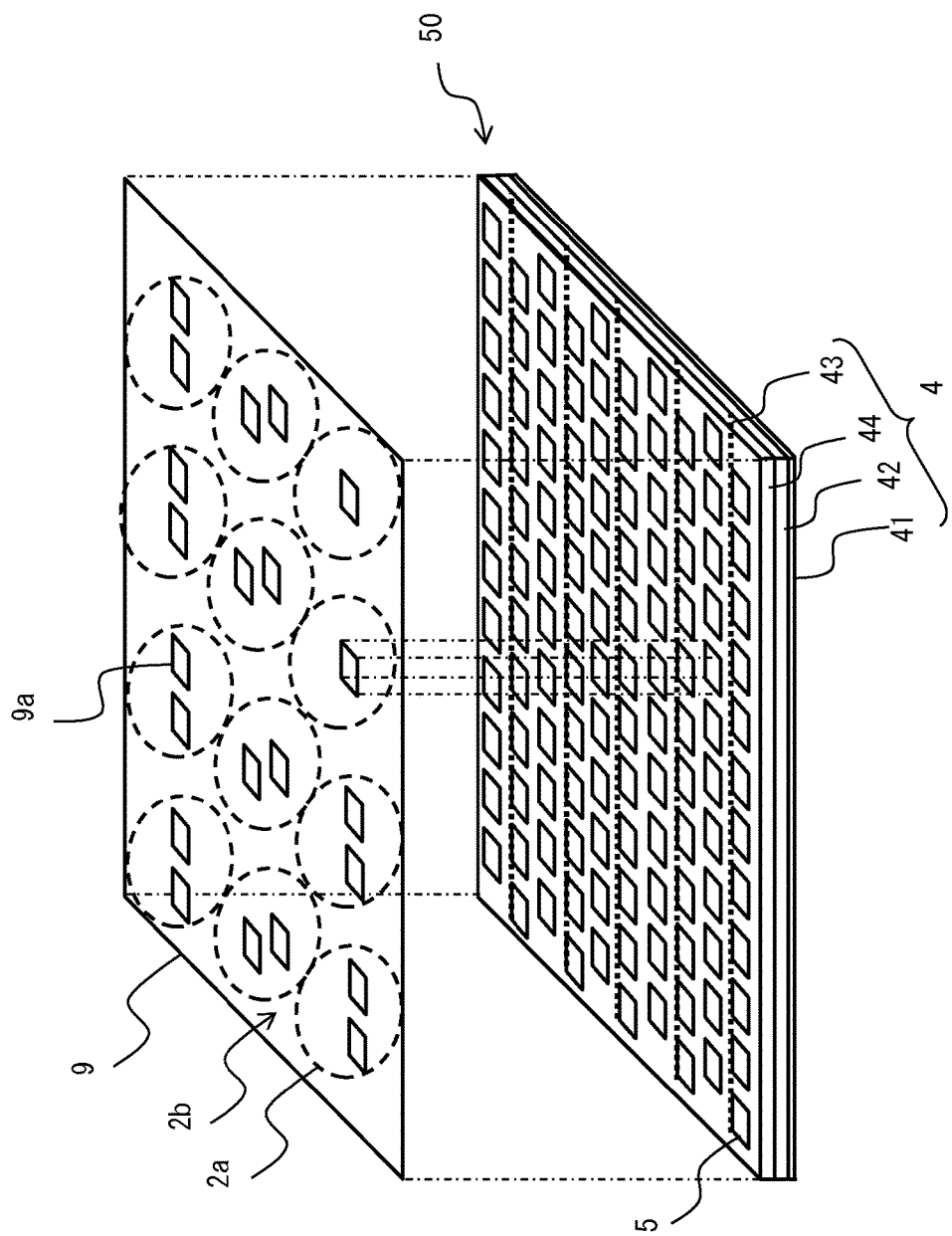
FIG. 16 is a perspective view showing the structure of a tag antenna unit and a metal foil sheet according to a second exemplary embodiment.
Figure 17:
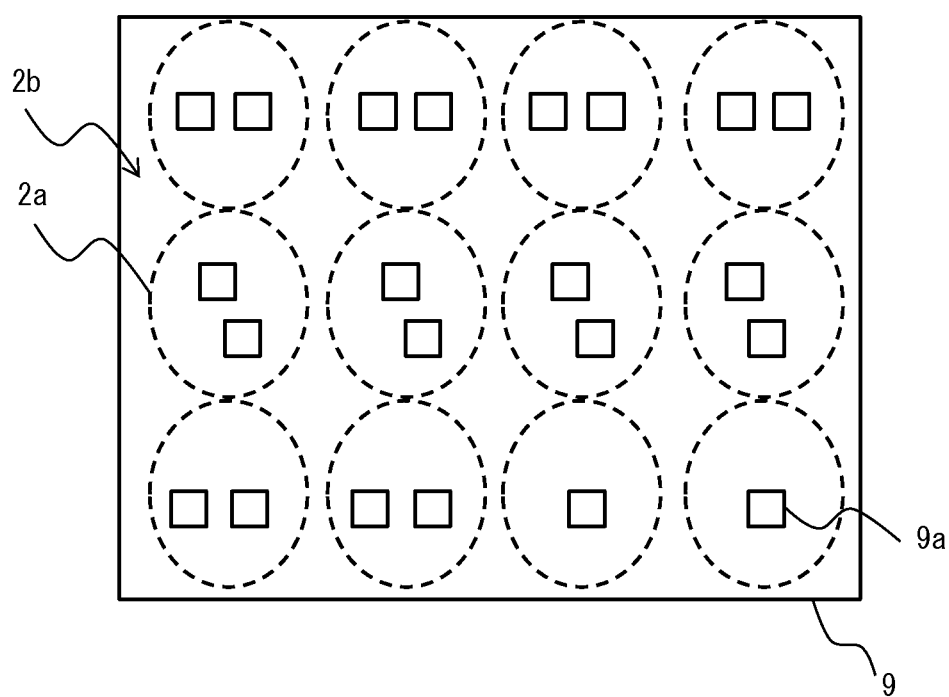
FIG. 17 is a top view showing the structure of the tag antenna unit and the metal foil sheet according to the second exemplary embodiment.
Figure 18:
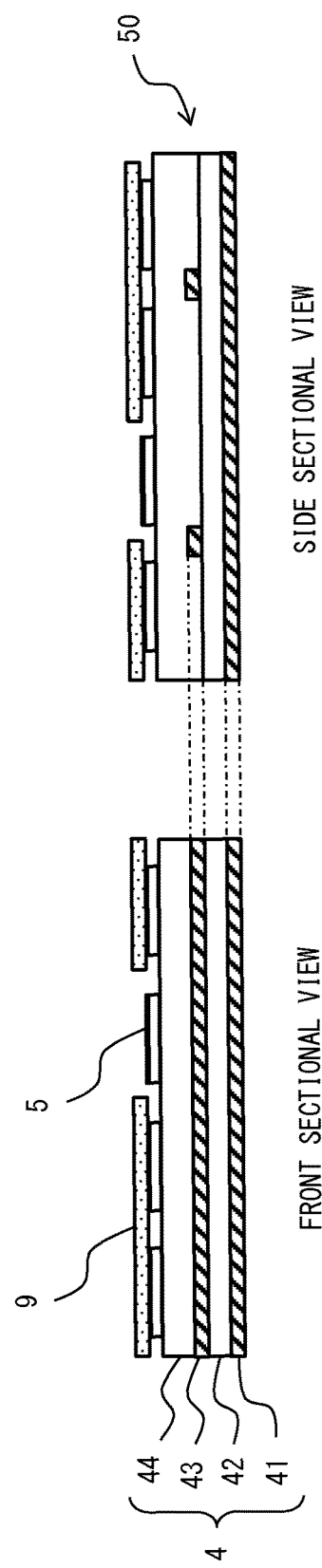
FIG. 18 is a sectional view showing the structure of the tag antenna unit and the metal foil sheet according to the second exemplary embodiment.
Figure 19:
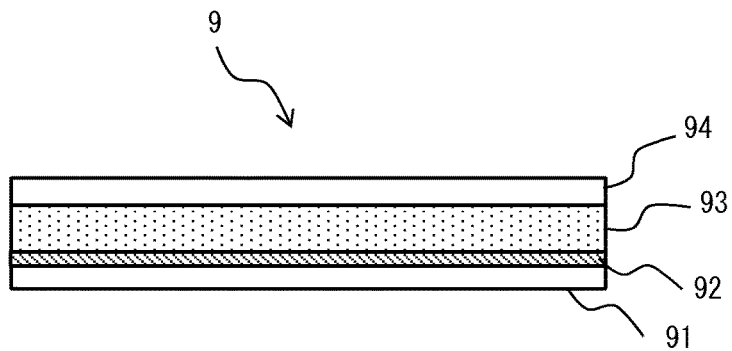
FIG. 19 is a sectional view showing the structure of the metal foil sheet according to the second exemplary embodiment.

An exemplary structure of the metal foil sheet according to this exemplary embodiment is described hereinafter with reference to FIGS. 16 to 19. FIG. 16 is a perspective view of the tag antenna unit 50 and a metal foil sheet 9, FIG. 17 is a top view of them, and FIG. 18 is a front sectional view and a side sectional view of them. FIG. 19 is a sectional view of the metal foil sheet 9. The structure of the tag antenna unit 50 that includes the reader waveguide 4 and the RFID tags 5 is the same as that described in the first exemplary embodiment.

As shown in FIGS. 16 to 18, the metal foil sheet 9 is placed above the tag antenna unit 50. In the tag antenna unit 50, the RFID tags 5 are placed in advance on the reader waveguide 4, and the metal foil sheet 9 is placed above the RFID tags 5. In this placement, the metal foil sheet 9 serves as an upper surface ground for strip conductor, and by covering the RFID tags that do not need to be read, the tags become unable to be read and a decrease in reading rate can be suppressed. Specifically, the metal foil sheet 9 is electromagnetically coupled to the RFID tags that do not need to be read to thereby reduce the signal intensity and stop (invalidate) the operation of the RFID tags, and further maintain (activate) the operation of the RFID tags that need to be read without affecting the signal intensity of those RFID tags. Furthermore, since the upper-surface ground is provided for the strip conductor, the radiation of electromagnetic waves from the upper surface can be suppressed. Accordingly, it is possible to reduce the radiation loss of the waveguide and extend the waveguide. In addition, other effects such as the suppression of electromagnetic interference with another equipment, the reduction of noise and the reduction of influence on human bodies can be obtained.

To implement such a feature, the metal foil sheet 9 is a sheet-like metal member (metal sheet) and has an opening (window) 9a at the position of the RFID tag that needs to be read. In the case where the metal foil sheet 9 is placed, commodities are placed on top of the metal foil sheet 9, and therefore the upper surface of the metal foil sheet 9 serves as the commodity displayable area 2b. The metal foil sheet 9 has the size and shape large enough to cover the RFID tag 5 in order to stop the response operation of the RFID tag 5 that does not need to be read. If the metal foil sheet 9 is smaller than the RFID tag 5, it fails to stop the response operation of the RFID tag 5 in some cases. Further, the metal foil sheet 9 preferably has at least the size of one commodity display position 2a, which is, the size large enough to cover the area which one kind of commodities occupy on the shelf. Further, the metal foil sheet 9 preferably has the size of covering all of the RFID tags 5, which is, substantially the same size as the commodity displayable area 2b or the reader waveguide 4 (tag antenna unit 50) in order to selectively invalidate or activate the operation of all RFID tags 5.

The opening (window) 9a is at the position corresponding to the RFID tag 5 in the commodity display position 2a. The opening 9a has the size and shape at least larger than the RFID tag 5 to enable the operation of the RFID tag 5 located below the metal foil sheet 9. For example, the opening 9a has substantially the same size as the RFID tag 5 and has the same shape as the RFID tag 5, which is a square.

The metal foil sheet 9 is metal foil such as aluminum foil, where a conductor is adhered to a resin sheet such as PET (polyethylene terephthalate) or paper such as synthetic paper. The conductor may be aluminum, copper, carbon, ITO (Indium Tin Oxide) or the like.

To be specific, as shown in FIG. 19, in the metal foil sheet 9, a conductor layer 92 is formed on a cove layer 91, a resin sheet 93 is formed on the conductor layer 92, and a cover layer 94 is formed on the resin sheet 93. It is preferred that the thickness of the metal foil sheet 9 is basically the skin thickness (the thickness at which the skin effect can be obtained) or more. For example, when the conductor layer 92 is a good conductor metal, a thickness of 2 microns or more is preferable. In order to effectively stop the operation of the RFID tag 5, the conductor layer 92 is preferably close to the RFID tag 5. Although the opening 9a is made by removing the layers from the cove layer 91 to the cover layer 94 in this example, at least the conductor layer 92 may be removed instead.

For example, the metal foil sheet 9 can be formed by Roll-to-roll processing such as a food packaging aluminum sheet. The conductor layer of the metal foil sheet 9 is formed by deposition, sputtering, plating, rolling or the like. The opening 9a is made by etching the metal layer, cutting the sheet or the like.

Further, the reader waveguide 4 includes a ground plane 41, a spacer 42, a strip conductor 43 and a spacer 44 as in the first exemplary embodiment. By directly placing the metal foil sheet 9 on the RFID tag 5, the metal foil sheet 9 and the RFID tag 5 are in close contact with each other (it is preferred that there is no gap between them so that the reader cannot read the tag). Further, the metal foil sheet 9 and the strip conductor are spaced from each other by the spacer 44 to form a strip line. With the spacer 44, it is possible to reduce the effect of the ground on the RFID tag. Note that, however, an increase in capacitance by the ground may be used for the size reduction of the RFID tag.

Note that a protective layer that protects the RFID tag 5 may be placed above the RFID tag 5. The metal foil sheet 9 may serve also as the protective layer. Further, a positioning mechanism for positioning of the metal foil sheet 9 with the strip conductor 43, the RFID tags 5 and the like placed therebelow may be provided. As the positioning mechanism, a mark or the like indicating the placement position of the metal foil sheet 9 may be displayed on the tag antenna unit 50.

Figure 20:
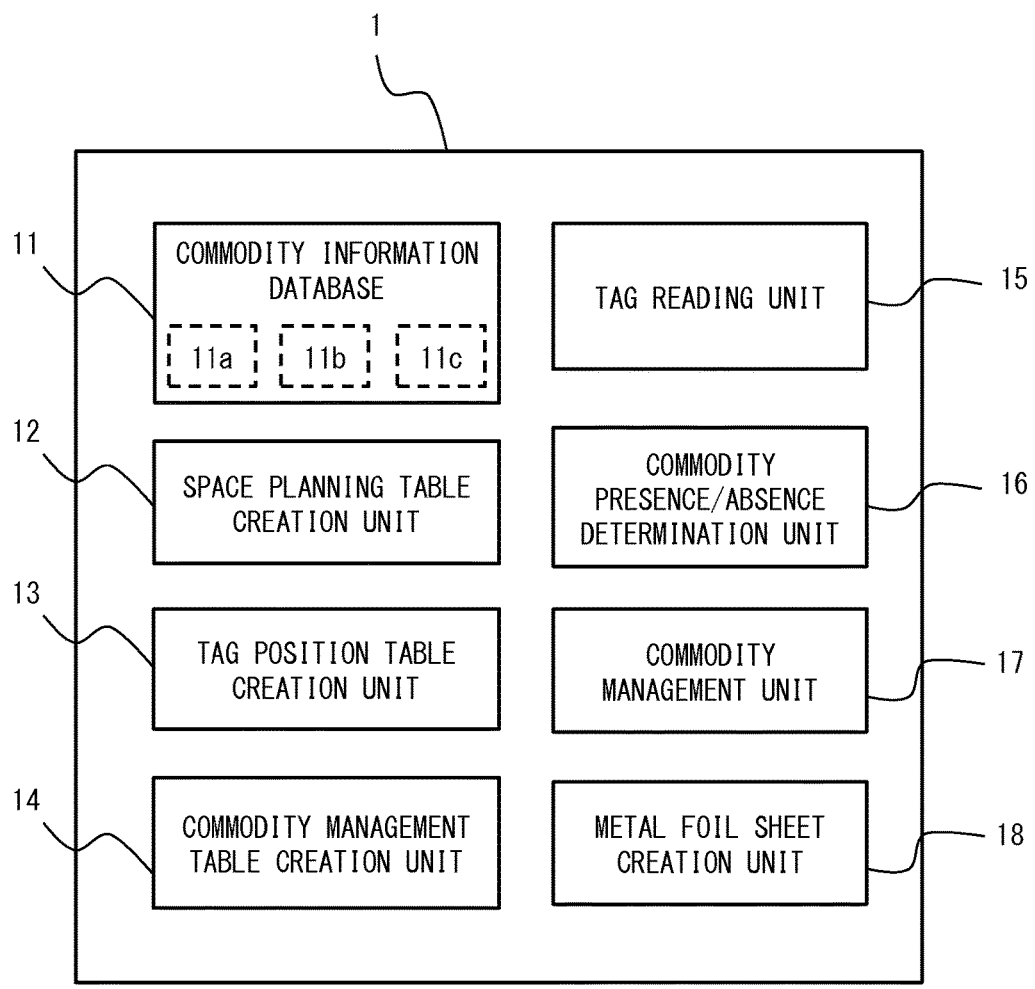
FIG. 20 is a block diagram showing the configuration of a store management device according to the second exemplary embodiment.

The configuration of the store management device 1 according to this exemplary embodiment is described hereinafter with reference to FIG. 20. In the exemplary configuration shown in FIG. 20, the store management device 1 includes a metal foil sheet creation unit 18 in addition to the elements according to the first exemplary embodiment shown in FIG. 10.

The metal foil sheet creation unit (metal sheet creation unit) 18 makes the opening 9a in the metal foil sheet 9 at the position of the RFID tag 5 corresponding to the commodity display position 2a. The metal foil sheet creation unit 18 makes the opening 9a at the position of the RFID tag 5 stored in the commodity management table 11c associating commodities and RFID tags 5. When the position information of the RFID tag 5 is contained in the commodity management table 11c, the metal foil sheet creation unit 18 acquires the position information from the commodity management table 11c, and when the position information of the RFID tag 5 is not contained in the commodity management table 11c, the metal foil sheet creation unit 18 refers to the tag position table 11b and acquires the position information of the RFID tag 5. For example, the size and shape of the metal foil sheet 9 are predetermined, and the metal foil sheet creation unit 18 makes the opening 9a by cutting out, from the metal foil sheet, the predetermined shape at the position of the RFID tag 5 for detecting a commodity. For example, the cutout of the metal foil sheet is performed using a label printer, a cutting machine or the like. Note that the metal foil sheet 9 may be created manually, instead of being automatically created by the metal foil sheet creation unit 18. For example, a store clerk or the like may refer to the commodity management table 11c and make the opening by manually making a hole at the position of the RFID tag 5. The opening may be made by providing a perforated cutout line with the shape of the opening at the positions corresponding to all of the RFID tags 5 and cutting out the sheet along the cutout line of a part corresponding to the commodity position.

Note that the metal foil sheet 9 may be created outside, without being created in the store management device 1. For example, a head office that consolidates the management of a plurality of retail stores may create the space planning table 11a using space planning software, create the tag position table 11b and the commodity management table 11c, and then make the opening 9a in the metal foil sheet 9 based on the commodity management table 11c. Then, the metal foil sheet 9 may be distributed from the head office to the plurality of retail stores. Further, in addition to the metal foil sheet 9, the commodity management table 11c may be distributed from the head office to the plurality of retail stores.

A commodity management method (article management method) that is performed in the commodity management system according to this exemplary embodiment is described hereinafter with reference to FIG. 21.

Figure 21:
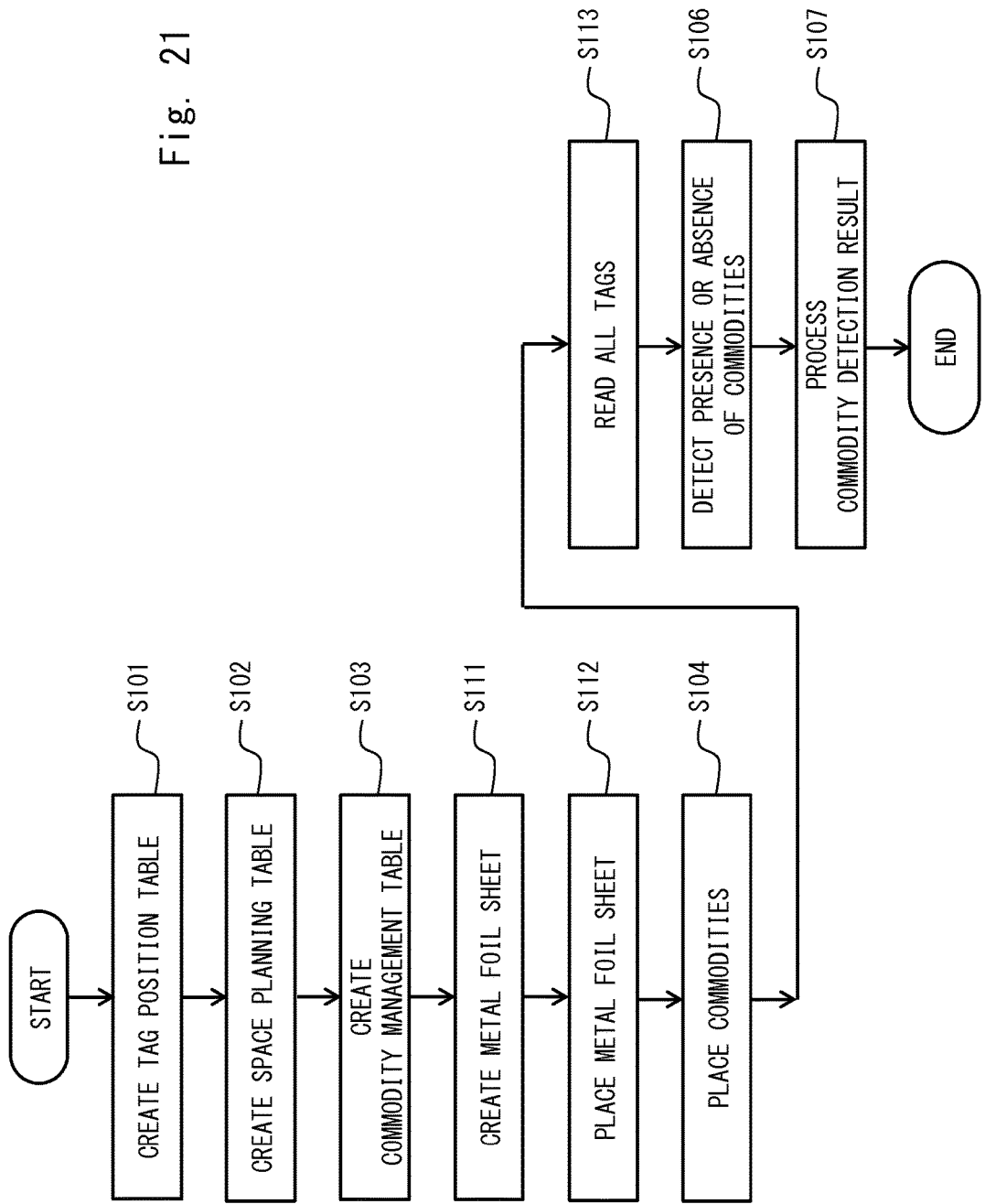
FIG. 21 is a flowchart showing a commodity management method according to the second exemplary embodiment.

As shown in FIG. 21, the tag position table 11b is created by associating the tag ID of the RFID tag and the position information of the RFID tag (S101), the space planning table 11a is created by associating the commodity information and the space planning information (S102), and the commodity management table 11c is created by associating the commodity information and the tag ID of the RFID tag (S103), in the same manner as in the first exemplary embodiment.

Then, the metal foil sheet creation unit 18 creates the metal foil sheet 9 based on the commodity management table 11c created in S103 (S111). The metal foil sheet creation unit 18 generates cutting information indicating the position and shape of the opening 9a based on the position of the RFID tag 5 stored in the commodity management table 11c and outputs it to a cutting machine or the like. The cutting machine cuts out the corresponding part of the metal foil sheet 9 according to the cutting information and thereby makes the opening 9a. Note that the metal foil sheet 9 that is formed in advance may be acquired.

Then, the metal foil sheet 9 is placed on the RFID tag 5 (tag antenna unit 50) (S112). A store clerk or the like places the metal foil sheet 9 created in S111 on the tag antenna unit 50 so that the RFID tag 5 corresponding to the opening 9a is exposed.

After the commodity management table 11c is created in S103 and the metal foil sheet 9 is placed in S112, a store clerk or the like places a commodity in the placement area on the metal foil sheet for commodity management (commodity detection) (S104). Then, the following processing is repeated to periodically monitor the presence or absence of the commodity.

First, the tag reading unit 15 reads the RFID tag through the reader waveguide 4 (S113). In this example, because unnecessary RFID tag does not respond because of the presence of the metal foil sheet 9, all of the RFID tags are read. Specifically, the tag reading unit 15 transmits a bulk read command for reading all tags to the RFID reader 7, and the RFID reader 7 outputs a signal to all the RFID tags 5 so as to send the tag ID back. In this exemplary embodiment, since the metal foil sheet 9 is placed, the tags that do not need to be read are not read because of the metal foil sheet 9 even if signals are output to all of the RFID tags. It is thereby possible to increase the reading operation speed without complicated control such as transmitting signals to the RFID tags 5 one by one.

Further, in order to further reduce the reading time, only the RFID tags corresponding to the commodity display positions may be read just like in the first exemplary embodiment.

Then, the commodity presence/absence determination unit 16 determines the presence or absence of the commodity according to the signal received from the RFID tag 5 (S106). The RFID reader 7 receives the signals sent back from all the RFID tags 5 in S113 and measures their signal intensity, and outputs the measurement result to the store management device 1. The commodity presence/absence determination unit 16 detects whether the tag with the tag ID contained in the commodity management table 11c is read, or whether the signal intensity of the RFID tag with the corresponding tag ID is equal to or more than a threshold or less than the threshold. When the RFID tag is not read or the signal intensity is less than the threshold, it is determined that there is a commodity corresponding to the RFID tag. Otherwise, it is determined that there is no corresponding commodity. After that, processing according to the commodity detection result is performed in the same manner as in the first exemplary embodiment (S107).

As described above, in this exemplary embodiment, the metal foil sheet having the openings corresponding to the RFID tags for detecting commodities is placed on the RFID tags, in addition to the structure of the first exemplary embodiment. Thus, even when a large number of RFID tags are placed, it is possible to stop the operation of unnecessary RFID tags and allow only necessary RFID tags to operate, thereby increasing the speed of RFID tag reading operation.

Third Exemplary Embodiment

A third exemplary embodiment is described hereinafter with reference to the drawings. This exemplary embodiment shows an example in which a space planning sheet is placed on the reader waveguide and the RFID tag (tag antenna unit) in the first exemplary embodiment. Note that, although the case where the space planning sheet is placed on the RFID tag is described in this example, the space planning sheet may be placed on the metal foil sheet that is described in the second exemplary embodiment.

Figure 22:
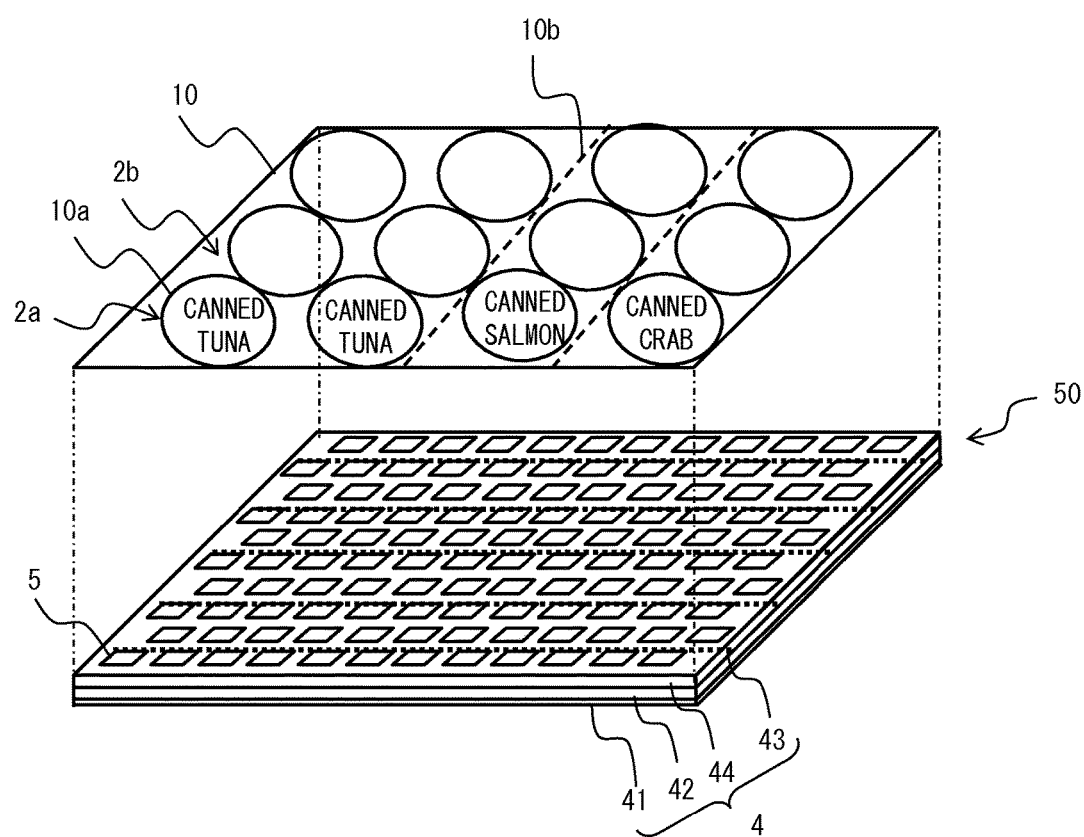
FIG. 22 is a perspective view showing the structure of a tag antenna unit and a space planning sheet according to a third exemplary embodiment.
Figure 23:
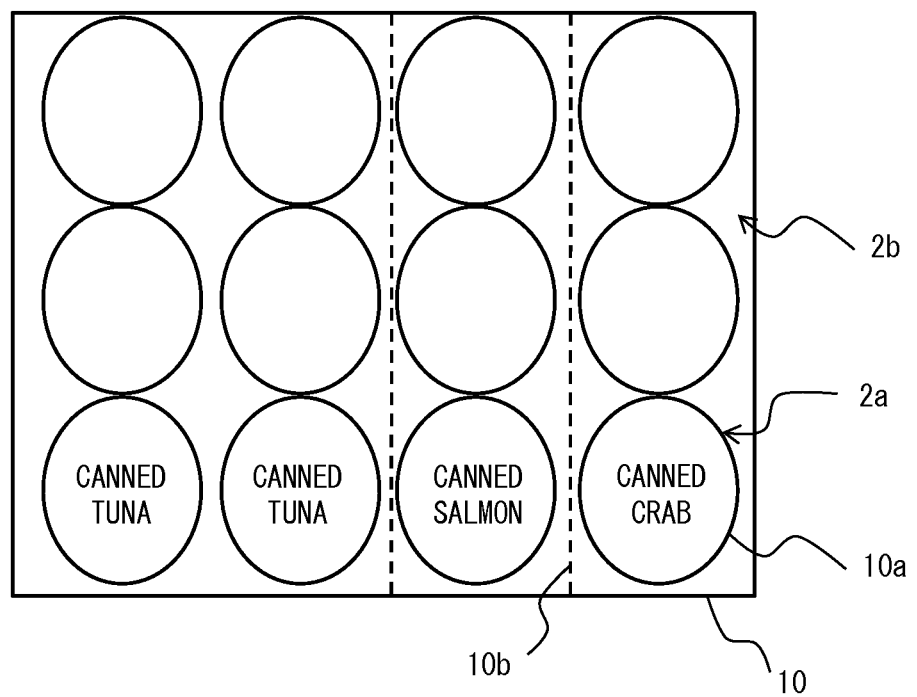
FIG. 23 is a top view showing the structure of the tag antenna unit and the space planning sheet according to the third exemplary embodiment.
Figure 24:
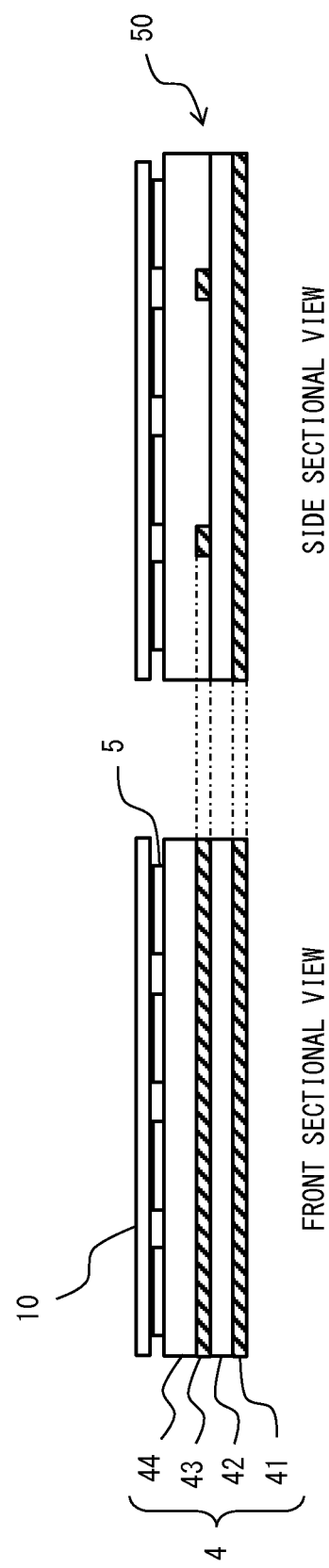
FIG. 24 is a sectional view showing the structure of the tag antenna unit and the space planning sheet according to the third exemplary embodiment.

An exemplary structure of the space planning sheet according to this exemplary embodiment is described hereinafter with reference to FIGS. 22 to 24. FIG. 22 is a perspective view of the tag antenna unit 50 and a space planning sheet 10, FIG. 23 is a top view of them, and FIG. 24 is a front sectional view and a side sectional view of them. The structure of the tag antenna unit 50 that includes the reader waveguide 4 and the RFID tags 5 is the same as that described in the first exemplary embodiment.

As shown in FIGS. 22 to 24, the space planning sheet 10 is placed above the tag antenna unit 50. In the tag antenna unit 50, the RFID tags 5 are placed in advance on the reader waveguide 4, and the space planning sheet 10 is placed above the RFID tags 5. The space planning sheet (article placement sheet) 10 is a sheet for showing space planning (commodity display positions) to store clerks or the like. In the case where the space planning sheet 10 is placed, commodities are placed on top of the space planning sheet 10, and therefore the upper surface of the space planning sheet 10 serves as the commodity displayable area 2b.

The space planning sheet 10 has a size large enough to place a commodity, and it has substantially the same size as the reader waveguide 4 (tag antenna unit 50) or the size to include all of the RFID tags 5, for example, for showing space planning of the whole shelf. Further, the space planning sheet 10 preferably has the size large enough to cover the area which one kind of commodities occupy on the shelf, including at least one commodity display position 2a.

The space planning sheet 10 may be made of any material that does not affect the detection of commodities (the signal intensity of RFID tags), and it is a paper sheet, for example. On the space planning sheet 10, a commodity placement mark 10a is displayed at the position of the commodity display position 2a. The commodity placement mark 10a has the same size as a commodity, and a commodity name for identifying the commodity to be placed is displayed thereon. Because the same commodities are placed in each face (column), the commodity name is displayed on the commodity placement mark 10a in the front row. The commodity placement mark 10a may be directly printed on a paper sheet or may be adhered to a paper sheet by a self-adhesive label or the like.

Further, the space planning sheet 10 may be provided with a perforated cutout line 10b. For example, the cutout line 10b is provided for each kind of commodities. Note that, in the case where the space planning sheet 10 is placed on the metal foil sheet, it is preferred to also provide the metal foil sheet with a cutlet line just like the perforated cutout line 10b in the space planning sheet 10. It is thereby possible to cut out the sheet for each kind of commodities, thereby flexibly dealing with a change in space planning. Further, the cutout line 10b may be provided for each commodity.

Note that a protective layer that protects the RFID tag 5 may be placed above the RFID tag 5. The space planning sheet 10 may serve also as the protective layer. Further, a positioning mechanism for positioning of the space planning sheet 10 with the RFID tags 5 and the like placed therebelow may be provided. As the positioning mechanism, a mark or the like indicating the placement position of the space planning sheet 10 may be displayed on the tag antenna unit 50. Further, in the case where the space planning sheet 10 is placed on the metal foil sheet 9, a mark or the like may be displayed on the space planning sheet 10.

Figure 25:
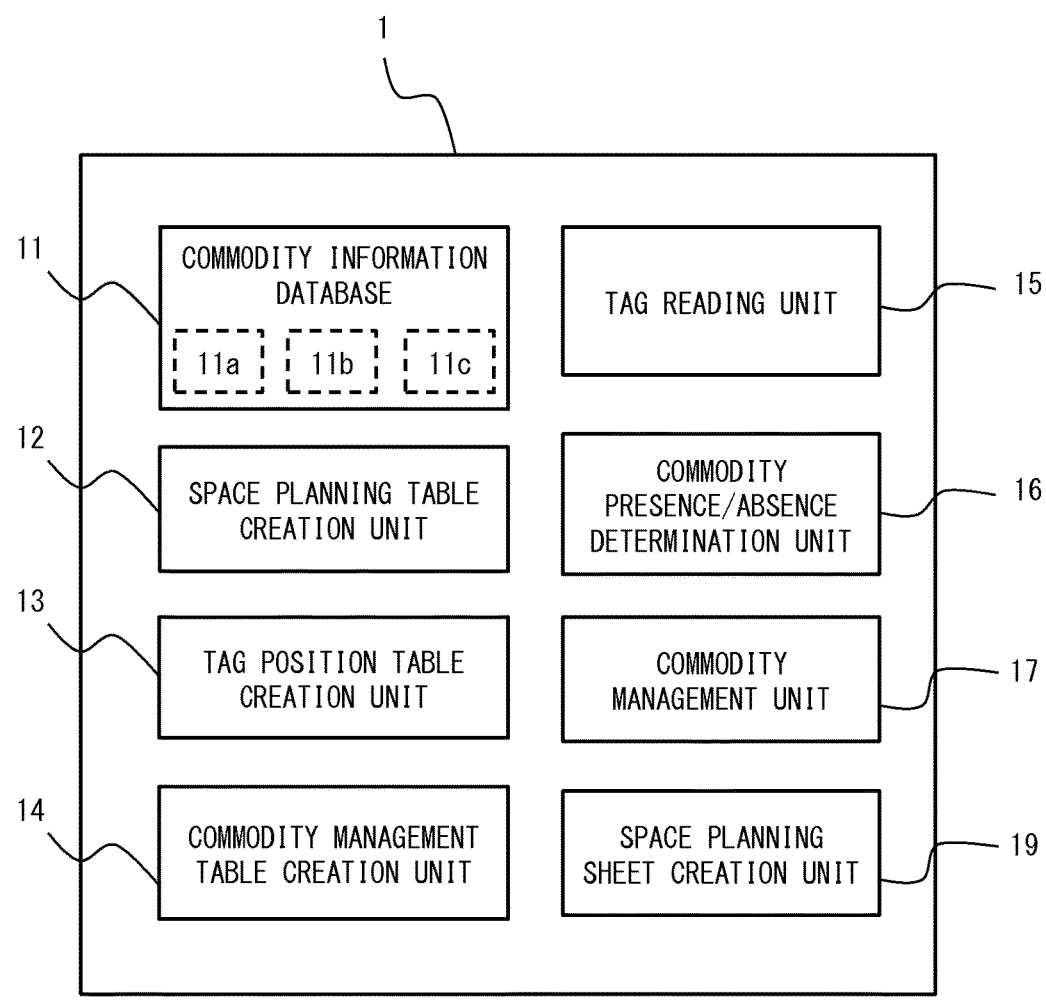
FIG. 25 is a block diagram showing the configuration of a store management device according to the third exemplary embodiment.

The configuration of the store management device 1 according to this exemplary embodiment is described hereinafter with reference to FIG. 25. In the exemplary configuration shown in FIG. 25, the store management device 1 includes a space planning sheet creation unit 19 in addition to the elements according to the first exemplary embodiment shown in FIG. 10.

The space planning sheet creation unit (article placement sheet creation unit) 19 puts the commodity placement mark 10a on the space planning sheet 10 at the position corresponding to the commodity display position 2a. The space planning sheet creation unit 19 makes the commodity placement mark 10a based on the space planning table 11a associating the commodity information and the space planning information. The space planning sheet creation unit 19 refers to the space planning table 11a and creates the mark to display a figure (outline) with a commodity size and a commodity name at the position specified by the space planning information for each commodity. For example, the commodity placement mark 10a is printed on a paper sheet by using a printer.

Note that the space planning sheet 10 may be created outside, without being created in the store management device 1. For example, a head office that consolidates the management of a plurality of retail stores may create the space planning table 11a using space planning software, and make the commodity placement mark 10a on the space planning sheet 10 based on the space planning table 11a. Then, the space planning sheet 10 may be distributed from the head office to the plurality of retail stores. Further, in addition to the space planning sheet 10, the commodity management table 11c may be distributed from the head office to the plurality of retail stores.

A commodity management method (article management method) that is performed in the commodity management system according to this exemplary embodiment is described hereinafter with reference to FIG. 26.

Figure 26:
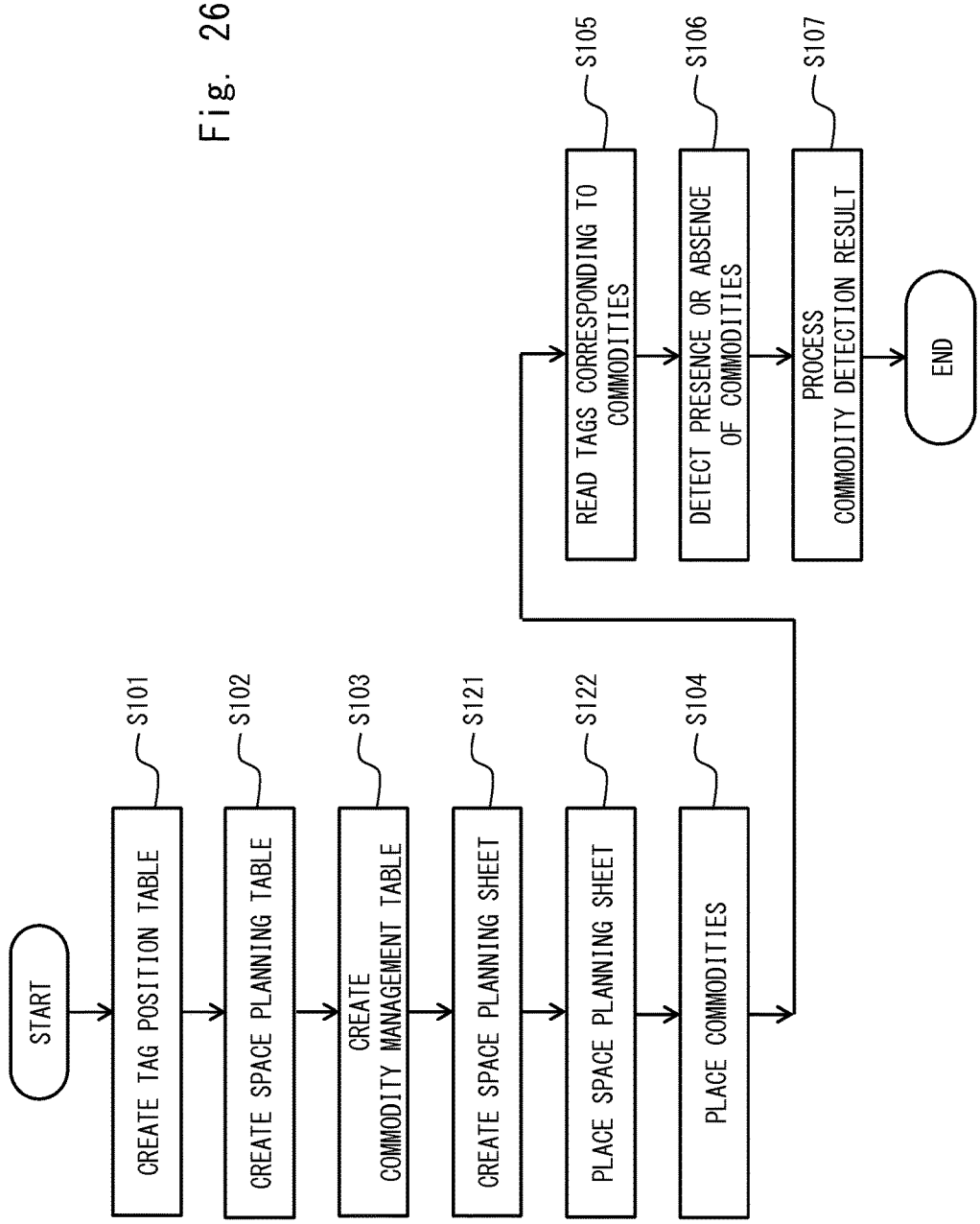
FIG. 26 is a flowchart showing a commodity management method according to the third exemplary embodiment.

As shown in FIG. 26, the tag position table 11b is created by associating the tag ID of the RFID tag and the position information of the RFID tag (S101), the space planning table 11a is created by associating the commodity information and the space planning information (S102), and the commodity management table 11c is created by associating the commodity information and the tag ID of the RFID tag (S103), in the same manner as in the first exemplary embodiment.

Then, the space planning sheet creation unit 19 creates the space planning sheet 10 based on the space planning table 11a created in S102 (S121). The space planning sheet creation unit 19 generates print information indicating the position, size and letter of the commodity placement mark 10a based on the space planning information stored in the space planning table 11a and the commodity size and the commodity name and outputs it to a printer or the like. The printer prints the commodity placement mark 10a at the corresponding part of the space planning sheet 10 according to the print information. Note that the space planning sheet 10 that is created in advance may be acquired.

Then, the space planning sheet 10 is placed on the RFID tag 5 (tag antenna unit 50) (S122). A store clerk or the like places the space planning sheet 10 created in S121 on the tag antenna unit 50 so that the RFID tags 5 and the commodity placement marks 10a correspond to each other.

After the commodity management table 11c is created in S103 and the space planning sheet 10 is placed in S122, a store clerk or the like places a commodity in the placement area on the space planning sheet for commodity management (commodity detection) (S104). Then, the following processing is repeated to periodically monitor the presence or absence of the commodity.

Specifically, in the same manner as in the first exemplary embodiment, the RFID tag 5 corresponding to a commodity is read (S105), the presence or absence of the commodity is determined according to the signal received from the RFID tag 5 (S106), and processing according to the detection result of the commodity is performed (S107).

As described above, in this exemplary embodiment, the space planning sheet indicating the commodity display positions is placed on the RFID tags, in addition to the structure of the first exemplary embodiment. The commodity display positions can be thereby recognized at a glance, and it is thereby possible to reduce the burden of commodity placement work by store clerks and prevent mistake of placement such as placing another commodity by mistake. Further, by creating the space planning sheet in a head office and distributing it to stores, it is possible to get across the store planning instruction from the head office to all stores.

It should be noted that the RFID system in UHF band or microwave band is used in the exemplary embodiments of the present invention because the bandwidth is wider and the number of tags read per unit time is larger compared to an RFID system using another frequency band such as LF band or HF band, particularly a lower frequency band, and the tag antenna sensitively responds to moisture.

It should be noted that the present invention is not limited to the above-described exemplary embodiment and may be varied in many ways within the scope of the present invention.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2013-105982, filed on May 20, 2013, the disclosure of which is incorporated herein in its entirety by reference.

REFERENCE SIGNS LIST

1 STORE MANAGEMENT DEVICE
2 COMMODITY
2a DISPLAY POSITION
2b COMMODITY DISPLAYABLE AREA
3 COMMUNICATION NETWORK
3a HIGH-FREQUENCY CABLE
4 READER WAVEGUIDE
5 RFID TAG
7 RFID READER
8 COMMODITY DISPLAY SHELF
9 METAL FOIL SHEET
9a OPENING
10 SPACE PLANNING SHEET
10a COMMODITY PLACEMENT MARK
10b CUTOUT LINE
11 COMMODITY INFORMATION DATABASE
11a SPACE PLANNING TABLE
11b TAG POSITION TABLE
11c COMMODITY MANAGEMENT TABLE
12 SPACE PLANNING TABLE CREATION UNIT
13 TAG POSITION TABLE CREATION UNIT
14 COMMODITY MANAGEMENT TABLE CREATION UNIT
15 TAG READING UNIT
16 COMMODITY PRESENCE/ABSENCE DETERMINATION UNIT
17 COMMODITY MANAGEMENT UNIT
18 METAL FOIL SHEET CREATION UNIT
19 SPACE PLANNING SHEET CREATION UNIT
41 GROUND PLANE
42 SPACER
43 STRIP CONDUCTOR
44 SPACER
45 PARALLEL LINES
46 DISTRIBUTOR
50 TAG ANTENNA UNIT
91 COVER LAYER
92 CONDUCTOR LAYER
93 RESIN SHEET
94 COVER LAYER
101 READER WAVEGUIDE
102 RFID TAG
103 TAG READING UNIT
104 ARTICLE PRESENCE/ABSENCE DETERMINATION UNIT
105 ARTICLE POSITION TABLE STORAGE UNIT
106 TAG POSITION TABLE STORAGE UNIT
107 ARTICLE MANAGEMENT TABLE STORAGE UNIT
108 ARTICLE
109 ALLOCABLE AREA
110 ASSIGNED POSITION
201 RFID CHIP
202 TAG ANTENNA

The invention claimed is:

1. An article management system comprising:
a reader waveguide formed as an open transmission line terminated with matching impedance;
a plurality of RFID tags fixed in an article allocable area above the reader waveguide and electromagnetically coupled to the reader waveguide;
a tag position table storage unit implemented by at least one storage device that stores a tag position table associating tag information of the plurality of RFID tags and fixed positions of the plurality of RFID tags;
an article position table storage unit implemented by the at least one storage device that stores an article position table associating identification information of articles and assigned positions of the articles assigned to place the articles in the allocable area;
an article management table storage unit implemented by the at least one storage device that stores an article management table associating the identification information of the articles and the tag information of the plurality of RFID tags based on the tag position table and the article position table;
a tag reading unit that reads the plurality of RFID tags by electromagnetic coupling through the reader waveguide; and
an article presence/absence determination unit implemented by a processor that determines presence or absence of an article corresponding to the plurality of RFID tags based on results of reading the plurality of RFID tags by referring to the article management table.

2. The article management system according to claim 1, wherein a size of the plurality of RFID tags is smaller than a size coming into contact with the allocable area when the article is placed.

3. The article management system according to claim 1, wherein an interval of the plurality of RFID tags is smaller than a size coming into contact with the allocable area when the article is placed.

4. The article management system according to claim 1, comprising:
an article management table creation unit that creates the article management table according to association between the fixed positions of the plurality of RFID tags in the tag position table and the assigned positions of the articles in the article position table.

5. The article management system according to claim 1, comprising
an article management table creation unit that receives input of the identification information of the articles and the tag information of the plurality of RFID tags in association and creates the article management table according to the input association.

6. The article management system according to claim 1, comprising:
a metal sheet placed on the plurality of RFID tags and having an opening at positions corresponding to RFID tags located within the assigned position of the article among the plurality of RFID tags, wherein
the article presence/absence determination unit determines presence or absence of the article placed on the metal sheet.

7. The article management system according to claim 6, comprising:
a metal sheet creation unit that makes the opening corresponding to positions of RFID tags in the article management table by referring to the article management table.

8. The article management system according to claim 1, comprising:
an article placement sheet placed on the plurality of RFID tags and where the assigned position of the article is displayed, wherein
the article presence/absence determination unit determines presence or absence of the article placed on the article placement sheet.

9. The article management system according to claim 6, comprising:
an article placement sheet placed on the metal sheet and where the assigned position of the article is displayed, wherein
the article presence/absence determination unit determines presence or absence of the article placed on the article placement sheet.

10. The article management system according to claim 8, comprising:
an article placement sheet creation unit that creates the article placement sheet according to the assigned positions of the articles in the article position table by referring to the article position table.

11. The article management system according to claim 1, wherein
the tag reading unit reads all of the plurality of RFID tags at a time, and
the article presence/absence determination unit determines presence or absence of the article based on results of reading RFID tags contained in the article management table among the results of reading.

12. The article management system according to claim 1, wherein
the tag reading unit reads RFID tags contained in the article management table among the plurality of RFID tags one by one, and
the article presence/absence determination unit determines presence or absence of the article based on all of the results of reading.

13. An article management method comprising:
fixing a plurality of RFID tags in an article allocable area above a reader waveguide formed as an open transmission line terminated with matching impedance, the plurality of RFID tags to be electromagnetically coupled to the reader waveguide;
storing a tag position table associating tag information of the plurality of RFID tags and fixed positions of the plurality of RFID tags;
storing an article position table associating identification information of articles and assigned positions of the articles assigned to place the articles in the allocable area;
storing an article management table associating the identification information of the articles and the tag information of the plurality of RFID tags based on the tag position table and the article position table;
reading the plurality of RFID tags by electromagnetic coupling through the reader waveguide; and
determining presence or absence of an article corresponding to the plurality of RFID tags based on results of reading the plurality of RFID tags by referring to the article management table.

14. A non-transitory computer readable medium storing an article management program causing a computer to execute an article management process, the article management process comprising:
storing a tag position table associating tag information of a plurality of RFID tags and fixed positions of the plurality of RFID tags, the plurality of RFID tags being fixed in an article allocable area above a reader waveguide formed as an open transmission line terminated with matching impedance and being electromagnetically coupled to the reader waveguide;
storing an article position table associating identification information of articles and assigned positions of the articles assigned to place the articles in the allocable area;
storing an article management table associating the identification information of the articles and the tag information of the plurality of RFID tags based on the tag position table and the article position table;
reading the plurality of RFID tags by electromagnetic coupling through the reader waveguide; and
determining presence or absence of an article corresponding to the plurality of RFID tags based on results of reading the plurality of RFID tags by referring to the article management table.

15. An article management system comprising:
a reader waveguide formed as an open transmission line terminated with matching impedance;
a plurality of RFID tags fixed in an article allocable area above the reader waveguide and electromagnetically coupled to the reader waveguide;
a tag position table storage means for storing a tag position table associating tag information of the plurality of RFID tags and fixed positions of the plurality of RFID tags;

an article position table storage means for storing an article position table associating identification information of articles and assigned positions of the articles assigned to place the articles in the allocable area;

an article management table storage means for storing an article management table associating the identification information of the articles and the tag information of the plurality of RFID tags based on the tag position table and the article position table;

a tag reading means for reading the plurality of RFID tags by electromagnetic coupling through the reader waveguide; and an article presence/absence determination means for determining presence or absence of an article corresponding to the plurality of RFID tags based on results of reading the plurality of RFID tags by referring to the article management table.

* * * * *